US011234188B2

(12) United States Patent
Liu et al.

(10) Patent No.: US 11,234,188 B2
(45) Date of Patent: Jan. 25, 2022

(54) METHODS OF MULTI-HOP RELAY NODE ACCESS, AND APPARATUS THEREFOR

(71) Applicant: Huawei Technologies Co., Ltd., Shenzhen (CN)

(72) Inventors: Jing Liu, Shanghai (CN); Rui Wang, Shanghai (CN); Yuanping Zhu, Shanghai (CN); Mingzeng Dai, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/808,001

(22) Filed: Mar. 3, 2020

(65) Prior Publication Data
US 2020/0205067 A1 Jun. 25, 2020

Related U.S. Application Data

(63) Continuation of application No. PCT/CN2018/103459, filed on Aug. 31, 2018.

(30) Foreign Application Priority Data

Sep. 4, 2017 (CN) .......................... 201710787135.0

(51) Int. Cl.
*H04W 48/18* (2009.01)
*H04W 48/06* (2009.01)
(Continued)

(52) U.S. Cl.
CPC ........... *H04W 48/18* (2013.01); *H04W 40/22* (2013.01); *H04W 48/06* (2013.01); *H04W 84/047* (2013.01); *H04W 88/04* (2013.01)

(58) Field of Classification Search
CPC ............ H04W 72/042; H04W 84/047; H04W 40/22; H04W 88/04; H04W 84/18; H04W 40/24; H04W 40/246; H04W 36/0009
See application file for complete search history.

(56) References Cited

U.S. PATENT DOCUMENTS 9,654,256 B2 * 5/2017 Chun .................... H04W 76/12
2011/0081903 A1 * 4/2011 Cai .................. H04W 36/0058
455/424
2012/0120866 A1 5/2012 Cai et al.
(Continued)

FOREIGN PATENT DOCUMENTS

CN 101166055 A 4/2008
CN 101291527 A 10/2008
(Continued)

OTHER PUBLICATIONS

Ericsson et al., "Stage-2 description of relaying into 36.300," EGPP TSG-RAN WG2 Meeting #70, R2-103437, Montreal, Canada, May 10-14, 2010, 24 pages.
(Continued)

*Primary Examiner* — Nam T Huynh
(74) *Attorney, Agent, or Firm* — Slater Matsil, LLP

(57) ABSTRACT

A network access method includes: learning, by a first RN, that a site type of a first communications site is an RN; and sending, by the first RN, first indication information to the first communications site, so that the first RN accesses the first communications site, where the first indication information carries information indicating that a site type of the first RN is an RN.

10 Claims, 18 Drawing Sheets

(51) Int. Cl.
  *H04W 84/04* (2009.01)
  *H04W 40/22* (2009.01)
  *H04W 88/04* (2009.01)

(56) References Cited

U.S. PATENT DOCUMENTS

| | | | |
|---|---|---|---|
| 2013/0094435 A1 | 4/2013 | Deng et al. | |
| 2013/0172000 A1* | 7/2013 | Phan | H04W 72/04 455/450 |
| 2013/0272190 A1* | 10/2013 | Du | H04W 28/16 370/315 |
| 2017/0214459 A1 | 7/2017 | Chun et al. | |
| 2018/0288823 A1* | 10/2018 | Hampel | H04W 76/15 |

FOREIGN PATENT DOCUMENTS

| | | |
|---|---|---|
| CN | 101534521 A | 9/2009 |
| CN | 101610563 A | 12/2009 |
| CN | 101668323 A | 3/2010 |
| CN | 101729121 A | 6/2010 |
| CN | 101932120 A | 12/2010 |
| CN | 102123480 A | 7/2011 |
| CN | 102348255 A | 2/2012 |
| CN | 102404820 A | 4/2012 |
| CN | 102405610 A | 4/2012 |
| CN | 102474797 B | 1/2014 |
| CN | 104620635 A | 5/2015 |
| CN | 105474559 A | 4/2016 |
| EP | 2422471 A2 | 2/2012 |
| EP | 2712262 A1 | 3/2014 |

OTHER PUBLICATIONS

Huawei, et al., "Stage-updates to RN initial attachment," 3GPP TSG-RAN2 Meeting #72, R2-106968, Jacksonville, FL, USA, Nov. 15-19, 2010, 4 pages.

* cited by examiner

TO FIG. 16B

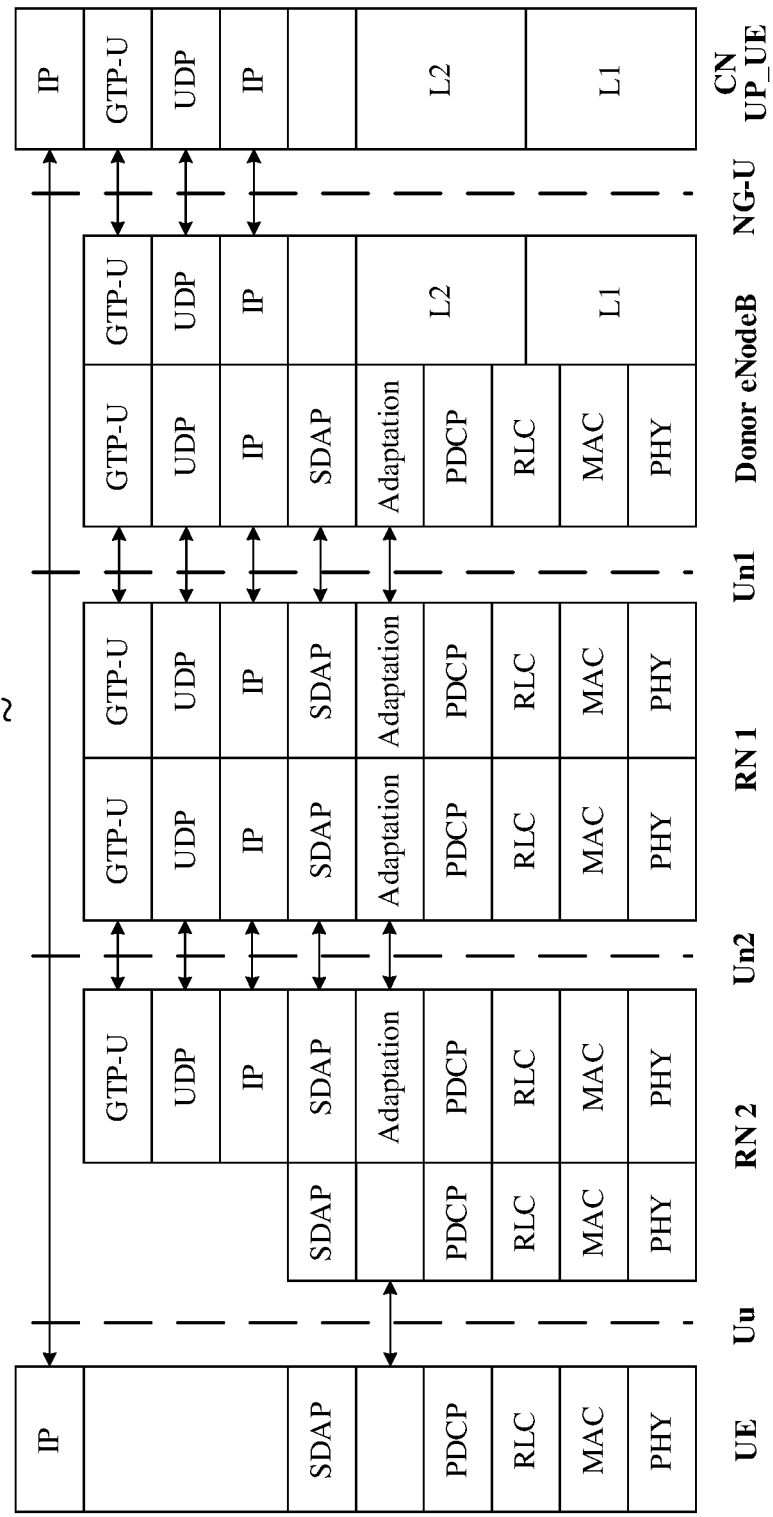

METHODS OF MULTI-HOP RELAY NODE ACCESS, AND APPARATUS THEREFOR

CROSS-REFERENCE TO RELATED APPLICATIONS

This application is a continuation of International Application No. PCT/CN2018/103459, filed on Aug. 31, 2018, which claims priority to Chinese Patent Application No. 201710787135.0, filed on Sep. 4, 2017. The disclosures of the aforementioned applications are hereby incorporated by reference in their entireties.

TECHNICAL FIELD

This application relates to the field of communication technologies, and in particular, to a network access method and apparatus, and an access control method and apparatus.

BACKGROUND

Development of technologies such as virtual reality (VR), augmented reality (AR), and internet of things brings more terminal devices in a future network and continuously increasing network data usage. To cooperate with more terminal devices and adapt to rapidly increasing network data usage in the market, currently, a higher requirement is imposed on a capacity of a fifth-generation (5G) wireless communications system.

SUMMARY

Embodiments of this application provide a network access method and apparatus, and an access control method and apparatus, to increase a capacity of a 5G network.

To achieve the foregoing objective, the embodiments of this application provide the following technical solutions.

According to a first aspect, a network access method is provided. The method includes: learning, by a first RN, that a site type of a first communications site is an RN; and sending, by the first RN, first indication information to the first communications site, so that the first RN accesses the first communications site, where the first indication information carries information indicating that a site type of the first RN is an RN. A base station is connected to a relay node, so that a signal coverage area can be expanded. In the method provided in the first aspect, the first communications site accessed by the first RN may be an RN, and two hops of RNs are at least deployed in a network. Therefore, compared with a scenario in which a single hop of RN is deployed in the prior art, a larger signal coverage area can be expanded, and a larger network capacity can be increased. In addition, an RN has a wireless self-backhauling function, so that costs of trenching and cable burying when a wired backhaul link is deployed in a conventional base station, deployment flexibility is improved, and the RN is particularly applicable to spreading, in an initial stage, of a 5G network and a network of an evolved communications system.

In a possible design, the learning, by a first RN, that a site type of a first communications site is an RN includes: obtaining, by the first RN, second indication information from the first communications site, where the second indication information carries information indicating that the site type of the first communications site is an RN; and determining, by the first RN based on the second indication information, that the site type of the first communications site is an RN.

In a possible design, before the learning, by a first RN, that a site type of a first communications site is an RN, the method further includes: obtaining, by the first RN, a candidate donor site list, where a site type of at least one communications site included in the candidate donor site list is a donor eNodeB or an RN; selecting, by the first RN, the first communications site based on signal quality information of the at least one communications site included in the candidate donor site list, where the candidate donor site list includes the first communications site; and camping, by the first RN, on a cell provided by the first communications site. In this possible design, the first RN may obtain the candidate donor site list, and select, from the candidate donor site list, an RN most suitable for the first RN to access, to camp on a cell provided by the RN. On one hand, a site type of an accessed site can be comprehensively considered. On the other hand, a case in which conventional UE may need to perform cell reselection for a plurality of times to select a most suitable cell is avoided, so that efficiency of an access process is increased.

In a possible design, the candidate donor site list includes at least one communications site obtained by the first RN from an OAM entity and/or at least one communications site obtained by the first RN through signal measurement.

According to a second aspect, an access control method is provided. The method includes: receiving, by a first RN, first access control information sent by a first communications site; and camping on or accessing, by the first RN based on the first access control information, a cell provided by the first communications site. In the method provided in the second aspect, the first RN may determine by itself whether to access the first communications site, so that the first RN can perform access control more flexibly.

In a possible design, the first access control information includes at least one of the following information: an RN-specific cell bar parameter, a hop count of an RN allowed to access the first communications site, a total quantity of RNs allowed to access the first communications site, load that the first communications site can bear, a type of the RN allowed to access the first communications site, and an indication indicating whether access is allowed. In this possible design, a quantity of RNs between UE accessing the first RN and a donor eNodeB can be controlled by performing access control on a hop count of an RN of an accessed communications site. An excessively long latency of communication between the UE and the donor eNodeB can be prevented by properly setting the hop count of the RN of the accessed communications site. Network load can be controlled by performing access control on a total quantity of RNs of the accessed communications site. Network overload and resource congestion can be prevented by properly setting the total quantity of the RNs. By performing access control on load of the accessed communications site, the load of the accessed communications site can be controlled, and overload of the accessed communications site can be prevented from affecting processing efficiency of the accessed communications site.

In a possible design, a site type of the first communications site is an RN or a donor eNodeB.

According to a third aspect, an access control method is provided. The method includes: sending, by a first RN, first access control related information to a first communications site, where the first access control related information is used by the first communications site or a donor eNodeB connected to the first communications site to determine whether to allow the first RN to access the first communications site. In the method provided in the third aspect, the first communications site or the donor eNodeB connected to the first communications site may determine whether to allow the first RN to access the first communications site, so that a network can control access of the first RN.

In a possible design, the first access control related information includes at least one of the following information: a hop count of the first RN, load of the first RN, and a type of the first RN. In this possible design, by performing access control on a hop count of an RN, a quantity of RNs between UE accessing an RN and the donor eNodeB can be controlled, and an excessively long latency of communication between the UE and the donor eNodeB can be prevented. By performing access control on load of the RN, network load can be controlled, and network overload and resource congestion can be prevented.

In a possible design, a site type of the first communications site is an RN or a donor eNodeB.

According to a fourth aspect, an access control method is provided. The method includes: receiving, by a first RN, second access control related information from a third RN; and determining, by the first RN based on access control information of the first RN and the second access control related information, whether to allow the third RN to access the first RN. In the method provided in the fourth aspect, the first RN may determine whether to allow the third RN to access the first RN, so that whether the third RN accesses a network is controlled by the network, and a burden on a donor eNodeB can be reduced compared with a case in which the donor eNodeB determines whether to allow the third RN to access the first RN.

In a possible design, before the determining, by the first RN based on access control information of the first RN and the second access control related information, whether to allow the third RN to access the first RN, the method further includes: generating, by the first RN, the access control information of the first RN based on access control information sent by a first communications site, where the first communications site is a communications site accessed by the first RN.

In a possible design, the second access control related information includes at least one of the following information: a hop count of the third RN, load of the third RN, and a type of the third RN. In this possible design, by performing access control on a hop count of an RN, a quantity of RNs between UE accessing an RN and the donor eNodeB can be controlled, and an excessively long latency of communication between the UE and the donor eNodeB can be prevented. By performing access control on load of the RN, network load can be controlled, and network overload and resource congestion can be prevented.

In a possible design, the access control information of the first RN includes at least one of the following information: an RN-specific cell bar parameter, a hop count of an RN allowed to access the first RN, a total quantity of RNs allowed to access the first RN, load that the first RN can bear, a type of the RN allowed to access the first RN, and an indication indicating whether access is allowed. In this possible design, a quantity of RNs between UE accessing the first RN and a donor eNodeB can be controlled by performing access control on a hop count of an RN of an accessed communications site. An excessively long latency of communication between the UE and the donor eNodeB can be prevented by properly setting the hop count of the RN of the accessed communications site. Network load can be controlled by performing access control on a total quantity of RNs of the accessed communications site. Network overload and resource congestion can be prevented by properly setting the total quantity of the RNs. By performing access control on load of the accessed communications site, the load of the accessed site can be controlled, and overload of the accessed communications site can be prevented from affecting processing efficiency of the accessed communications site.

In a possible design, a site type of the first communications site is an RN or a donor eNodeB.

According to a fifth aspect, an access control method is provided. The method includes: receiving, by a first RN, second access control related information from a third RN; and sending, by the first RN, the second access control related information to a first communications site, where the second access control related information is used by the first communications site or a donor eNodeB connected to the first communications site to determine whether to allow the third RN to access the first RN, and the first communications site is a communications site accessed by the first RN. In the method provided in the fifth aspect, the first communications site or the donor eNodeB connected to the first communications site may determine whether to allow the third RN to access the first RN, so that a network can control access of the third RN.

In a possible design, the second access control related information includes at least one of the following information: a hop count of the third RN, load of the third RN, and a type of the third RN.

According to a sixth aspect, an access control method is provided. The method includes: receiving, by a first communications site, second access control information sent by a donor eNodeB or a second RN, where a site type of the first communications site is an RN; generating, by the first communications site, first access control information of the first communications site based on the second access control information; and sending, by the first communications site, the first access control information to a first RN, where the first access control information is used by the first RN to camp on or access a cell provided by the first communications site. In the method provided in the sixth aspect, the first communications site sends the first access control information to the first RN, so that the first RN can determine by itself whether to access the first communications site, so that the first RN can perform access control more flexibly.

In a possible design, the first access control information includes at least one of the following information: an RN-specific cell bar parameter, a hop count of an RN allowed to access the first communications site, a total quantity of RNs allowed to access the first communications site, load that the first communications site can bear, a type of the RN allowed to access the first communications site, and an indication indicating whether access is allowed.

In a possible design, when the first communications site receives the second access control information sent by the donor eNodeB, the second access control information includes at least one of the following information: the RN-specific cell bar parameter, a hop count of an RN allowed to access the donor eNodeB, a total quantity of RNs allowed to access the donor eNodeB, load that the donor eNodeB can bear, a type of the RN allowed to access the donor eNodeB, and an indication indicating whether access is allowed; or when the first communications site receives the second access control information sent by the second RN, the second access control information includes at least one of the following information: the RN-specific cell bar parameter, a hop count of an RN allowed to access the second RN, a total quantity of RNs allowed to access the second RN, load that the second RN can bear, a type of the RN allowed to access the second RN, and an indication indicating whether access is allowed.

According to a seventh aspect, an access control method is provided. The method includes: sending, by a donor eNodeB, first access control information of the donor eNodeB to a first RN, where the first access control information is used by the first RN to camp on or access a cell provided by the donor eNodeB. In the method provided in the seventh aspect, the donor eNodeB sends the first access control information of the donor eNodeB to the first RN, so that the first RN can determine by itself whether to access the donor eNodeB, so that the first RN can perform access control more flexibly.

In a possible design, the first access control information includes at least one of the following information: an RN-specific cell bar parameter, a hop count of an RN allowed to access the donor eNodeB, a total quantity of RNs allowed to access the donor eNodeB, load that the donor eNodeB can bear, a type of the RN allowed to access the donor eNodeB, and an indication indicating whether access is allowed.

According to an eighth aspect, an access control method is provided. The method includes: receiving, by a donor eNodeB, first access control related information sent by a first RN; and determining, by the donor eNodeB based on the first access control related information, whether to allow the first RN to access a cell provided by the donor eNodeB or a first communications site, where the first communications site is an RN connected to the donor eNodeB. In the method provided in the eighth aspect, the donor eNodeB may determine whether to allow the first RN to access the cell provided by the donor eNodeB or the first communications site, so that a network can control access of the first RN.

In a possible design, the first access control related information includes at least one of the following information: a hop count of the first RN, load of the first RN, and a type of the first RN.

According to a ninth aspect, an access control method is provided. The method includes: sending, by a donor eNodeB, access control information of the donor eNodeB to a first RN, where the access control information is used by the first RN to generate access control information of the first RN. In the method provided in the ninth aspect, the donor eNodeB may send the access control information of the donor eNodeB to the first RN, so that the first RN can determine, based on the access control information of the first RN by itself, whether to allow a third RN to access the first RN, further whether the third RN accesses a network is controlled by the network, and a burden on the donor eNodeB can be reduced compared with a case in which the donor eNodeB determines whether to allow the third RN to access the first RN; or so that the first RN can send the access control information of the first RN to a third RN, the third RN determines whether to access the first RN, and access of the third RN is more flexible.

In a possible design, the access control information of the first RN includes at least one of the following information: an RN-specific cell bar parameter, a hop count of an RN allowed to access the first RN, a total quantity of RNs allowed to access the first RN, load that the first RN can bear, a type of the RN allowed to access the first RN, and an indication indicating whether access is allowed.

In a possible design, the access control information of the donor eNodeB includes at least one of the following information: the RN-specific cell bar parameter, a hop count of an RN allowed to access the donor eNodeB, a total quantity of RNs allowed to access the donor eNodeB, load that the donor eNodeB can bear, a type of the RN allowed to access the donor eNodeB, and an indication indicating whether access is allowed.

According to a tenth aspect, an access control method is provided. The method includes: receiving, by a donor eNodeB by using a first RN, second access control related information sent by a third RN; and determining, by the donor eNodeB based on the second access control related information and access control information of the donor eNodeB, whether to allow the third RN to access the first RN. In the method provided in the tenth aspect, the donor eNodeB may determine whether to allow the third RN to access the first RN, so that a network may centrally control access of an RN.

In a possible design, the second access control related information includes at least one of the following information: a hop count of the third RN, load of the third RN, and a type of the third RN.

In a possible design, the access control information of the donor eNodeB includes at least one of the following information: an RN-specific cell bar parameter, a hop count of an RN allowed to access the donor eNodeB, a total quantity of RNs allowed to access the donor eNodeB, load that the donor eNodeB can bear, a type of the RN allowed to access the donor eNodeB, and an indication indicating whether access is allowed.

According to an eleventh aspect, a network access apparatus is provided. The network access apparatus has a function of implementing any method according to the first aspect. The function may be implemented by hardware, or may be implemented by hardware executing corresponding software. The hardware or the software includes one or more units corresponding to the function.

According to a twelfth aspect, an access control apparatus is provided. The access control apparatus has a function of implementing any method according to the second aspect, the third aspect, the fourth aspect, or the fifth aspect. The function may be implemented by hardware, or may be implemented by hardware executing corresponding software. The hardware or the software includes one or more units corresponding to the function.

According to a thirteenth aspect, an access control apparatus is provided. The access control apparatus has a function of implementing any method according to the sixth aspect. The function may be implemented by hardware, or may be implemented by hardware executing corresponding software. The hardware or the software includes one or more units corresponding to the function.

According to a fourteenth aspect, an access control apparatus is provided. The access control apparatus has a function of implementing any method according to the seventh aspect, the eighth aspect, the ninth aspect, or the tenth aspect. The function may be implemented by hardware, or may be implemented by hardware executing corresponding software. The hardware or the software includes one or more units corresponding to the function.

According to a fifteenth aspect, a network access apparatus is provided, and includes a memory and a processor. The memory is configured to store a computer-executable instruction, and the processor executes the computer-executable instruction stored in the memory, so that the network access apparatus implements any method according to the first aspect.

According to a sixteenth aspect, an access control apparatus is provided, and includes a memory and a processor. The memory is configured to store a computer-executable instruction, and the processor executes the computer-executable instruction stored in the memory, so that the access control apparatus implements any method according to the second aspect, the third aspect, the fourth aspect, or the fifth aspect.

According to a seventeenth aspect, an access control apparatus is provided, and includes a memory and a processor. The memory is configured to store a computer-executable instruction, and the processor executes the computer-executable instruction stored in the memory, so that the access control apparatus implements any method according to the sixth aspect.

According to an eighteenth aspect, an access control apparatus is provided, and includes a memory and a processor. The memory is configured to store a computer-executable instruction, and the processor executes the computer-executable instruction stored in the memory, so that the access control apparatus implements any method according to the seventh aspect, the eighth aspect, the ninth aspect, or the tenth aspect.

According to a nineteenth aspect, a network access apparatus is provided. The apparatus may exist in a product form of a chip. The apparatus includes a processor, a memory, and a transceiver component. The transceiver component includes an input/output circuit. The memory is configured to store a computer-executable instruction. The processor executes the computer-executable instruction stored in the memory, to implement any method according to the first aspect.

According to a twentieth aspect, an access control apparatus is provided. The apparatus may exist in a product form of a chip. The apparatus includes a processor, a memory, and a transceiver component. The transceiver component includes an input/output circuit. The memory is configured to store a computer-executable instruction. The processor executes the computer-executable instruction stored in the memory, to implement any method according to the second aspect, the third aspect, the fourth aspect, or the fifth aspect.

According to a twenty-first aspect, an access control apparatus is provided. The apparatus may exist in a product form of a chip. The apparatus includes a processor, a memory, and a transceiver component. The transceiver component includes an input/output circuit. The memory is configured to store a computer-executable instruction. The processor executes the computer-executable instruction stored in the memory, to implement any method according to the sixth aspect.

According to a twenty-second aspect, an access control apparatus is provided. The apparatus may exist in a product form of a chip. The apparatus includes a processor, a memory, and a transceiver component. The transceiver component includes an input/output circuit. The memory is configured to store a computer-executable instruction. The processor executes the computer-executable instruction stored in the memory, to implement any method according to the seventh aspect, the eighth aspect, the ninth aspect, or the tenth aspect.

According to a twenty-third aspect, a computer-readable storage medium is provided, and includes an instruction. When run on a computer, the instruction enables the computer to perform any method according to the first aspect.

According to a twenty-fourth aspect, a computer readable storage medium is provided, and includes an instruction. When run on a computer, the instruction enables the computer to perform any method according to the second aspect, the third aspect, the fourth aspect, or the fifth aspect.

According to a twenty-fifth aspect, a computer-readable storage medium is provided, and includes an instruction. When run on a computer, the instruction enables the computer to perform any method according to the sixth aspect.

According to a twenty-sixth aspect, a computer-readable storage medium is provided, and includes an instruction. When run on a computer, the instruction enables the computer to perform any method according to the seventh aspect, the eighth aspect, the ninth aspect, or the tenth aspect.

According to a twenty-seventh aspect, a computer program product including an instruction is provided. When run on a computer, the computer program product enables the computer to perform any method according to the first aspect.

According to a twenty-eighth aspect, a computer program product including an instruction is provided. When run on a computer, the computer program product enables the computer to perform any method according to the second aspect, the third aspect, the fourth aspect, or the fifth aspect.

According to a twenty-ninth aspect, a computer program product including an instruction is provided. When run on a computer, the computer program product enables the computer to perform any method according to the sixth aspect.

According to a thirtieth aspect, a computer program product including an instruction is provided. When run on a computer, the computer program product enables the computer to perform any method according to the seventh aspect, the eighth aspect, the ninth aspect, or the tenth aspect.

For beneficial effects of any implementation in any one of the eleventh aspect to the thirtieth aspect, refer to beneficial effects of a corresponding implementation in the first aspect to the tenth aspect. Details are not described herein again.

BRIEF DESCRIPTION OF THE DRAWINGS

FIG. 16A and FIG. 16B are a schematic diagram of a protocol stack architecture according to an embodiment of this application;

DETAILED DESCRIPTION OF ILLUSTRATIVE EMBODIMENTS

The following describes the technical solutions in the embodiments of this application with reference to the accompanying drawings in the embodiments of this application. In descriptions of this application, "/" means "or" unless otherwise specified. For example, A/B may represent A or B. In this specification, "and/or" describes only an association relationship for describing associated objects, and represents that three relationships may exist. For example, A and/or B may represent the following three cases: Only A exists, both A and B exist, and only B exists. In addition, in the descriptions of this application, "a plurality of" means two or more than two.

A method provided in the embodiments of this application may be applied to a wireless communications system, such as a global system for mobile communications (GSM) system, a code division multiple access (CDMA) system, a wideband code division multiple access (WCDMA) system, a general packet radio service (GPRS) system, or a universal mobile telecommunications system (UMTS) system. In particular, the method may be applied to a long term evolution (LTE) system and an evolved system thereof, a long term evolution-advanced (LTE-A) system and an evolved system thereof, and a 5G wireless communications system.

The method provided in the embodiments of this application may be applied to a relay node (or a base station, which may be specifically a donor eNodeB). The relay node (or the base station) includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a UNIX operating system, an Android operating system, an iOS operating system, or a windows operating system. The application layer includes applications such as a browser, a contact list, word processing software, and instant messaging software. In addition, a specific structure of an execution body of the method provided in the embodiments of this application is not particularly limited in the embodiments of this application, provided that a program that records code of the method provided in the embodiments of this application can be run to perform communication according to the method provided in the embodiments of this application. For example, the execution body of the method provided in the embodiments of this application may be a relay node (or a base station) or a function module that can invoke a program and execute the program in a relay node (or a base station).

Figure 1:
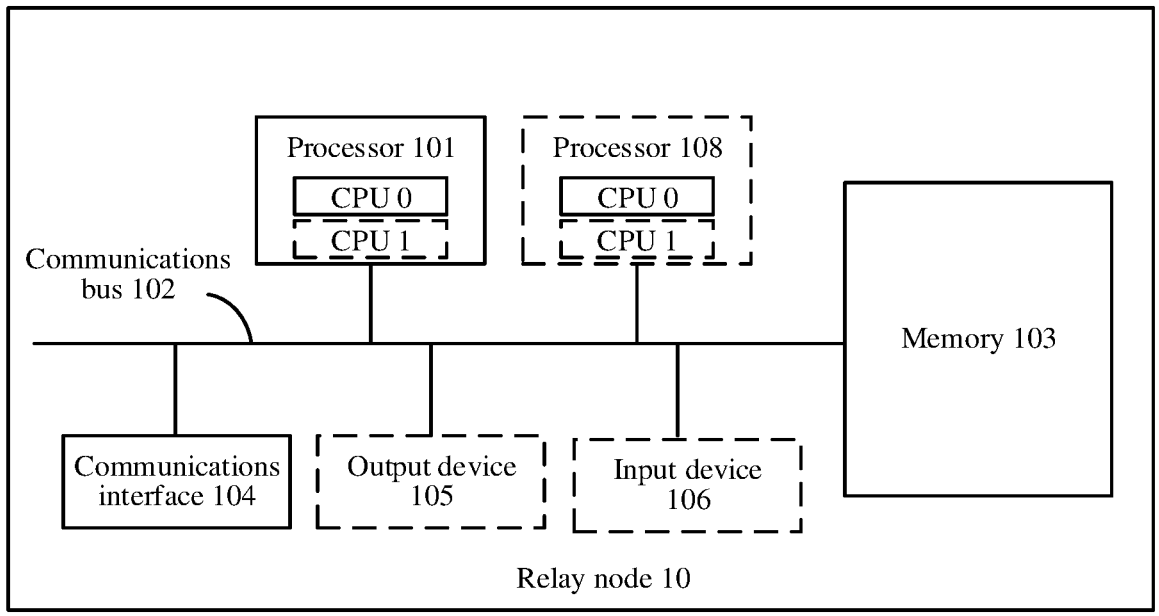
FIG. 1 is a schematic diagram of a hardware structure of a relay node according to an embodiment of this application.

FIG. 1 is a schematic diagram of a hardware structure of a relay node 10 according to an embodiment of this application. The relay node 10 includes at least one processor 101, a communications bus 102, a memory 103, and at least one communications interface 104.

The processor 101 may be a general purpose CPU, a microprocessor, an application-specific integrated circuit (ASIC), or one or more integrated circuits for controlling program execution of the solutions in this application.

The communications bus 102 may include a path for transmitting information between the foregoing components.

The communications interface 104 may be any apparatus such as a transceiver, and is configured to communicate with another device or a communications network such as the Ethernet, a radio access network (RAN), or a wireless local area network (WLAN).

The memory 103 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor by using the bus. The memory may alternatively be integrated with the processor.

The memory 103 is configured to store application program code for executing the solutions in this application, and the processor 101 controls the execution of the application program code. The processor 101 is configured to execute the application program code stored in the memory 103, to implement the following methods provided in the embodiments of this application.

During specific implementation, in an embodiment, the processor 101 may include one or more CPUs, for example, a CPU 0 and a CPU 1 in FIG. 1.

During specific implementation, in an embodiment, the relay node 10 may include a plurality of processors, such as the processor 101 and a processor 108 in FIG. 1. Each of the processors may be a single-core (single-CPU) processor, or may be a multi-core (multi-CPU) processor. The processor herein may be one or more devices, circuits, and/or processing cores configured to process data (for example, a computer program instruction).

During specific implementation, in an embodiment, the relay node 10 may further include an output device 105 and an input device 106.

Figure 2:
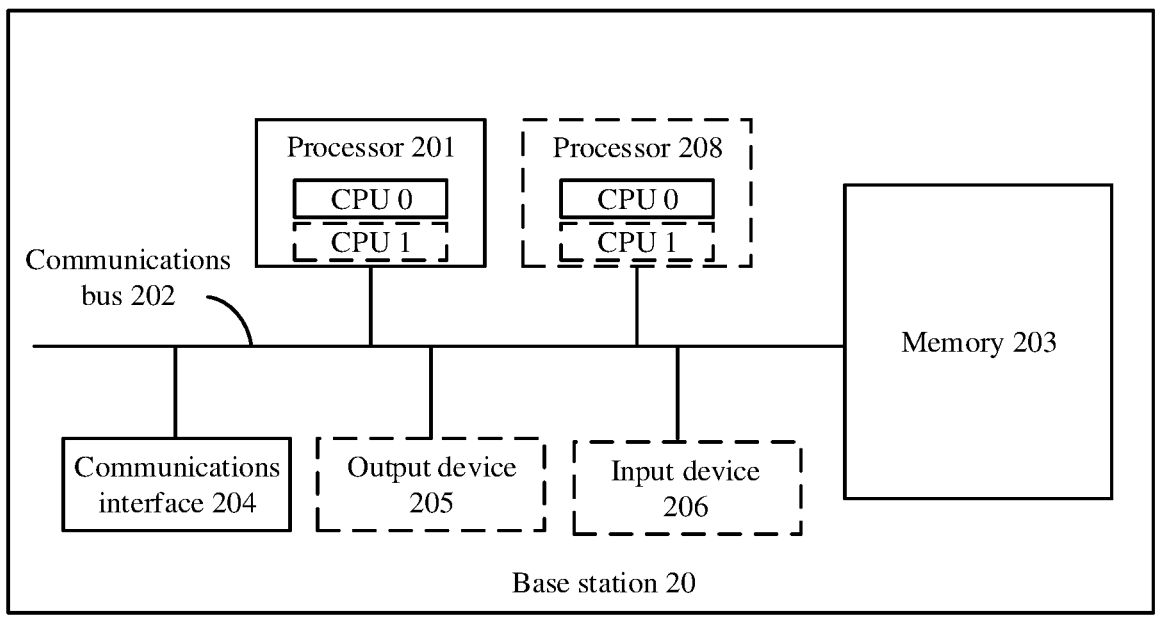
FIG. 2 is a schematic diagram of a hardware structure of a base station according to an embodiment of this application.

FIG. 2 is a schematic diagram of a hardware structure of a base station 20 according to an embodiment of this application. The base station 20 includes at least one processor 201, a communications bus 202, a memory 203, and at least one communications interface 204.

During specific implementation, in an embodiment, the processor 201 may include one or more CPUs, for example, a CPU 0 and a CPU 1 in FIG. 2.

During specific implementation, in an embodiment, the base station 20 may include a plurality of processors, such as the processor 201 and a processor 208 in FIG. 2.

During specific implementation, in an embodiment, the base station 20 may further include an output device 205 and an input device 206. For functions and other descriptions of the components shown in FIG. 2, refer to the foregoing example descriptions.

Figure 3:
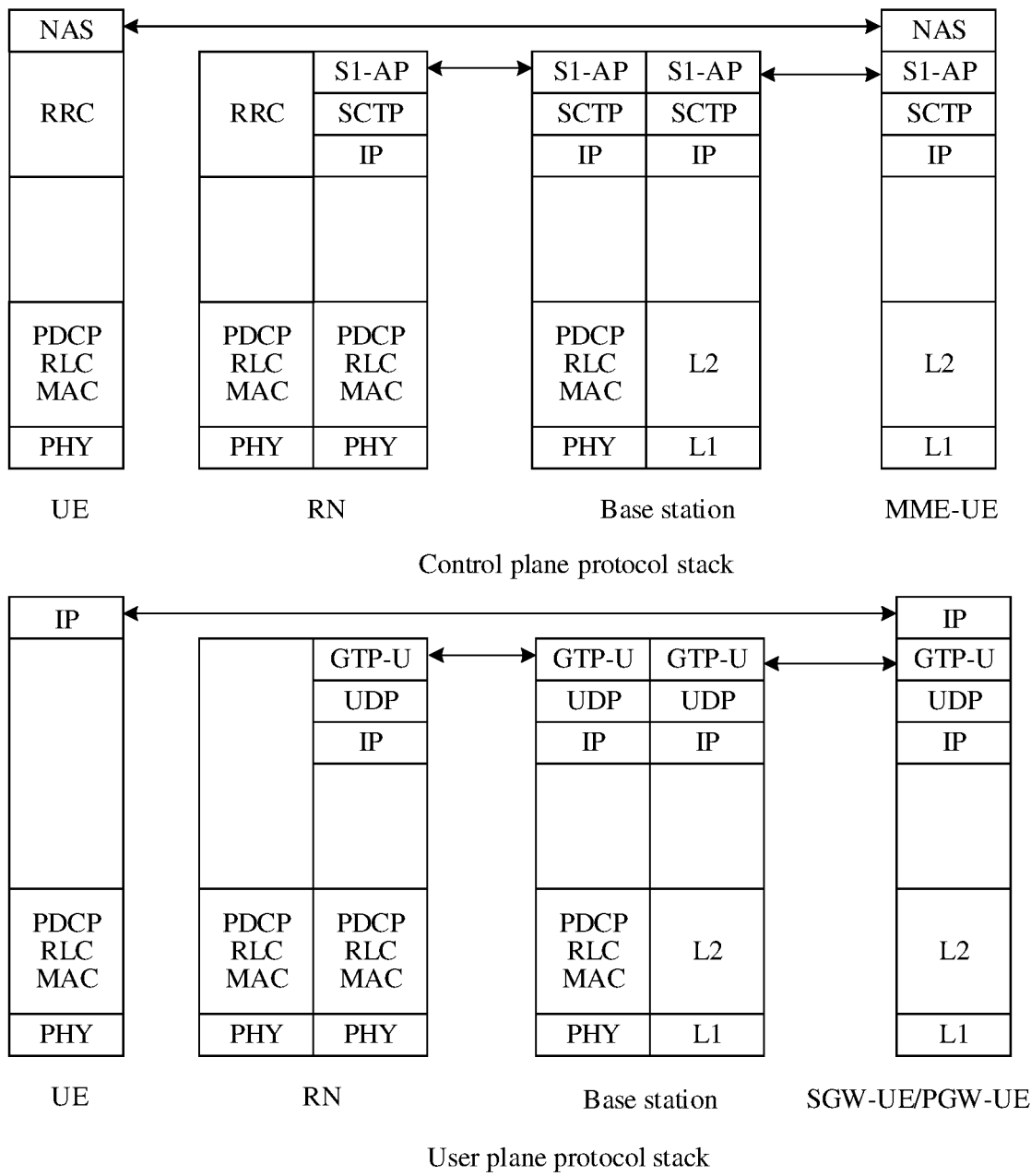
FIG. 3 is a schematic diagram of a protocol stack architecture of an LTE R10 Relay according to an embodiment of this application.

A relay (Relay) technology is introduced into LTE Release 10 (LTE R10). FIG. 3 shows a protocol stack architecture of an LTE R10 relay. A control plane includes user equipment (UE relay node (RN), a base station, and a mobility management entity (MME) (denoted as MME-UE in the figure) that serves the UE. A protocol stack of the UE includes a non-access stratum (NAS), a radio resource control (RRC) layer, a packet data convergence protocol (PDCP) layer, a radio link control (RLC) layer, a media access control (MAC) layer, and a physical layer (PHY) from top to bottom. A protocol stack of the RN for communicating with the UE includes an RRC layer, a PDCP layer, an RLC layer, a MAC layer, and a PHY layer from top to bottom; and a protocol stack of the RN for communicating with the base station includes an S1 application protocol (S1-AP) layer, a stream control transmission protocol (SCTP) layer, an internet protocol (IP) layer, a PDCP layer, an RLC layer, a MAC layer, and a PHY layer from top to bottom. A protocol stack of the base station for communicating with the RN includes an S1-AP layer, an SCTP layer, an IP layer, a PDCP layer, an RLC layer, a MAC layer, and a PHY layer from top to bottom; and a protocol stack of the base station for communicating with the MME-UE includes an S1-AP layer, an SCTP layer, an IP layer, a data link layer (which may also be referred to as an L2 layer), and a physical layer (which may also be referred to as an L1 layer) from top to bottom. A protocol stack of the MME-UE includes a NAS layer, an S1-AP layer, an SCTP layer, an IP layer, an L2 layer, and an L1 layer from top to bottom. The control plane of the R10 relay has a complete protocol stack. An RRC message of the UE is terminated at the RN, and the RN provides proxy of an S1/X2 message for the UE. An S1 interface is an interface between the base station and a CN control plane entity, and an X2 interface may be an interface between the base station and the RN (or between RNs).

A user plane includes UE, an RN, a base station, and a serving gateway (S-GW)/public data network gateway (PGW) (denoted as SGW-UE/PGW-UE in the figure) that serves the UE. A protocol stack of the UE includes an IP layer, a PDCP layer, an RLC layer, a MAC layer, and a PHY layer from top to bottom. A protocol stack of the RN for communicating with the UE includes a PDCP layer, an RLC layer, a MAC layer, and a PHY layer from top to bottom; and a protocol stack of the RN for communicating with the base station includes a general packet radio service tunneling protocol-user plane (GTP-U) layer, a user datagram protocol (UDP) layer, an IP layer, a PDCP layer, an RLC layer, a MAC layer, and a PHY layer from top to bottom. A protocol stack of the base station for communicating with the RN includes a GTP-U layer, a UDP layer, an IP layer, a PDCP layer, an RLC layer, a MAC layer, and a PHY layer from top to bottom; and a protocol stack of the base station for communicating with the SGW-UE/PGW-UE includes a GTP-U layer, a UDP layer, an IP layer, an L2 layer, and an L1 layer from top to bottom. The SGW-UE/PGW-UE includes an IP layer, a GTP-U layer, a UDP layer, an IP layer, an L2 layer, and an L1 layer from top to bottom. The user plane of the R10 relay also has a complete protocol stack, can provide an air interface data radio bearer (DRB) transmission service for the UE, and can aggregate data of a plurality of UEs and forward the aggregated data to the base station by using a backhaul link.

Figure 4:
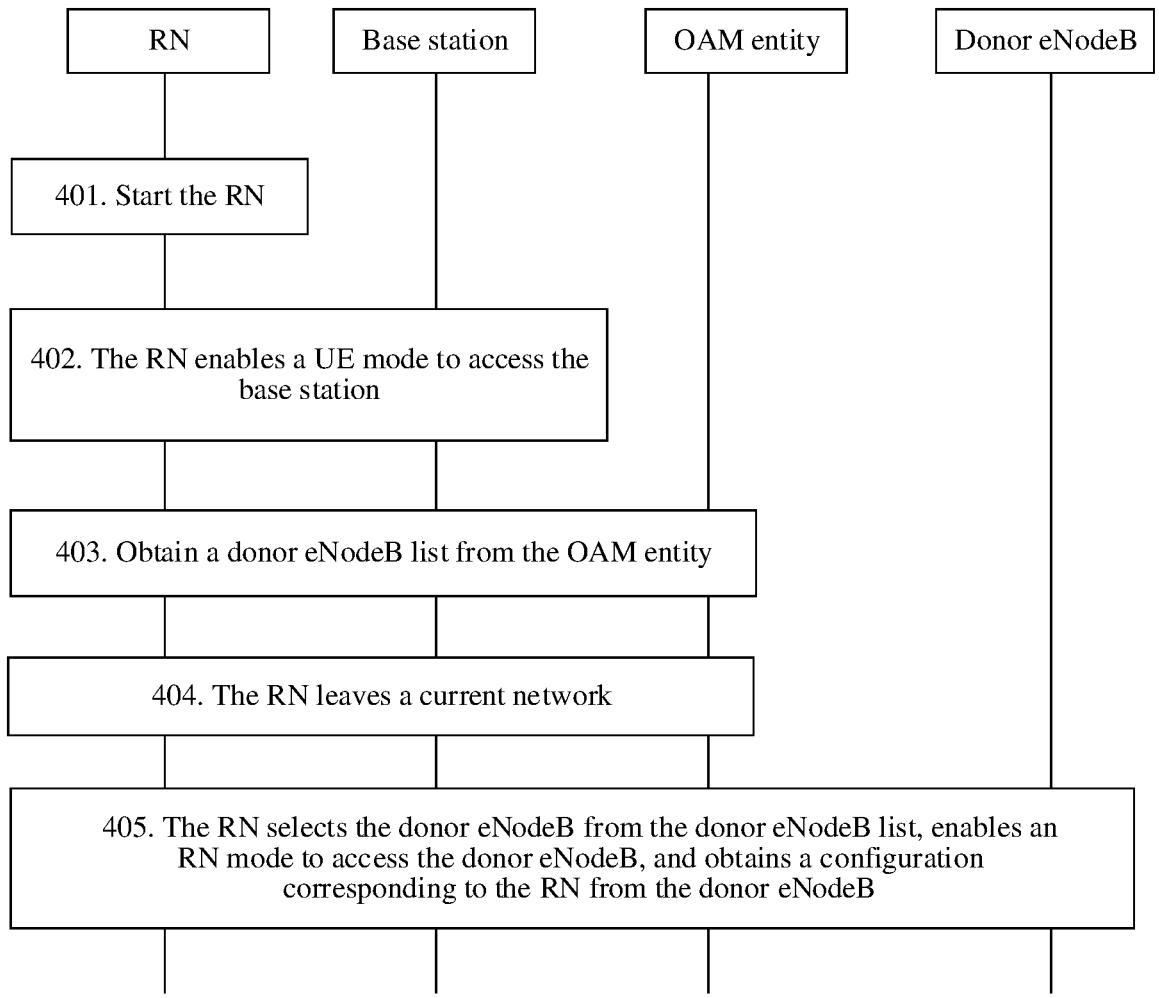
FIG. 4 is a flowchart of a method for accessing a network by an RN in an LTE system according to an embodiment of this application.

Referring to FIG. 4, a procedure of accessing a network by an RN in an LTE system may specifically include the following steps. 401. Start the RN. 402. The RN enables a UE mode to access a common base station (the common base station may be a donor eNodeB, or may not be a donor eNodeB), and sets up a control plane connection and a data plane connection, and in this case, the RN performs network attachment as initially configured regular UE. 403. Obtain a donor eNodeB list from an operation, administration and maintenance (OAM) entity. 404. The RN leaves a current network, for example, disconnects from the network by performing a detachment process. 405. The RN selects a donor eNodeB from the donor eNodeB list, enables an RN mode to access the donor eNodeB. To be specific, the RN identifies the RN as an RN in a process of accessing the donor eNodeB, and obtains a configuration corresponding to the RN from the donor eNodeB. It can be learned that the RN needs to perform two steps to access the network. To be specific, the RN first accesses a common base station (namely, a non-donor eNodeB), and then accesses the donor eNodeB.

A current LTE network supports only a single-hop RN deployment scenario.

Figure 5:
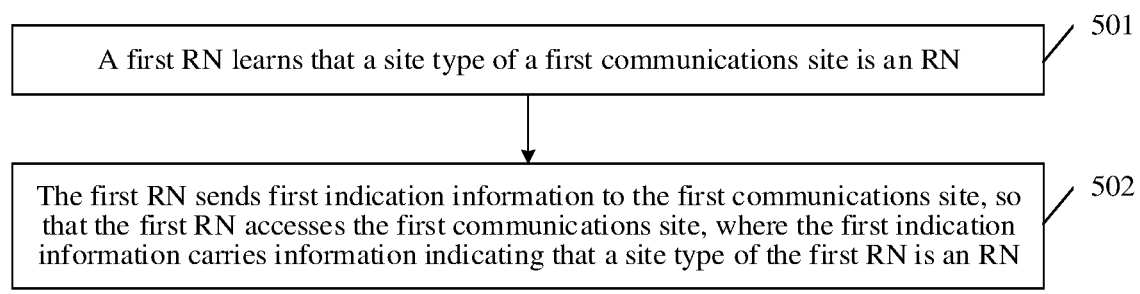
FIG. 5 is a flowchart of a network access method according to an embodiment of this application.

An embodiment of this application provides a network access method. As shown in FIG. 5, the method may include the following steps.

501. A first RN learns that a site type of a first communications site is an RN.

A site type of a communications site may be a common base station, a donor eNodeB, or an RN.

Optionally, during specific implementation, step 501 may include: obtaining, by the first RN, second indication information from the first communications site, where the second indication information carries information indicating that the site type of the first communications site is an RN; and determining, by the first RN based on the second indication information, that the site type of the first communications site is an RN. The first RN may further learn of the site type of the first communications site based on identity information of the first communications site.

Specifically, when the first RN camps on a cell provided by the first communications site, the second indication information may be included in a broadcast message (for example, a system message) or RRC dedicated signaling; or when the first RN does not camp on a cell provided by the first communications site, the second indication information may be included in a broadcast message. The second indication information that is broadcast by the first communications site is used to represent that the site type of the first communications site is an RN having a capability of accessing a multi-hop RNs.

For example, the first RN receives a broadcast message of a cell provided by a communications site. If the broadcast message carries the second indication information, the first RN considers the communications site providing the cell as a communications site having a capability of accessing a multi-hop RN. If the broadcast message does not include the second indication information, the first RN considers the communications site providing the cell as a common base station. In this case, after accessing the communications site and obtaining a donor eNodeB list, the first RN disconnects from the communications site. For example, the first RN may access a network by using the first step in a two-step access method in which an RN accesses a network in conventional LTE R10 (for details, refer to FIG. 4). If the broadcast message includes a donor eNodeB indication, the first RN considers the communications site providing the cell as a donor eNodeB.

Specifically, the first RN may enable a UE mode, perform cell selection/reselection, and select, according to a cell selection criterion, a suitable cell to camp on. In this embodiment of this application, the communications site providing the cell is the first communications site.

Optionally, the cell selection criterion may be a criterion formulated based on historical frequency information and signal strength. For details, refer to the prior art.

Optionally, the cell selected by the first RN to camp on may be a cell having best signal quality on a plurality of frequencies, and the plurality of frequencies all may be optional frequencies. Alternatively, the cell selected by the first RN to camp on may be a cell having best signal quality on one frequency, and the frequency may be a frequency determined based on historical frequency information. The optional method can improve communication quality of the first RN.

502. The first RN sends first indication information to the first communications site, so that the first RN accesses the first communications site, where the first indication information carries information indicating that a site type of the first RN is an RN.

Optionally, before step 501, the method may further include the following steps (11) to (13).

(11) The first RN obtains a candidate donor site list, where a site type of a communications site included in the candidate donor site list is a donor eNodeB or an RN.

Optionally, the candidate donor site list includes identity information of at least one communications site having a capability of accessing a multi-hop RN. The identity information may include at least one of the following information: a global base station identifier, a global cell identifier, a physical cell identifier, deployment frequency information, an RN indication, and hop count information. The global base station identifier is used to identify a communications site. The global cell identifier is used to represent a global identifier of a cell provided by a communications site. The physical cell identifier is used to represent a physical cell identifier of the cell provided by the communications site. The RN indication is used to represent whether the communications site is an RN. Further, if a site type of the communications site is an RN, the hop count information is used to represent a hop count of the communications site.

Optionally, the candidate donor site list includes at least one communications site obtained by the first RN from an OAM entity and/or at least one communications site obtained by the first RN through signal measurement.

For example, the candidate donor site list may include at least one pre-configured communications site, or the candidate donor site list may include the at least one communications site obtained by the first RN through signal measurement, or the candidate donor site list may include at least one pre-configured communications site and the at least one communications site obtained by the first RN through signal measurement.

For example, after the first RN accesses a common base station, the OAM entity or the common base station configures a donor eNodeB list for the first RN. The OAM entity may send the donor eNodeB list to the first RN by using a user plane. The common base station may send the donor eNodeB list to the first RN by using a control plane. The first RN stores the donor eNodeB list, disconnects from the common base station, and performs cell selection/reselection again. The first RN performs measurement, and obtains at least one RN by scanning a working frequency and/or reading a system message of a measured cell. The at least one RN includes site identity information of a communications site to which the measured cell belongs. Finally, the first RN combines the donor eNodeB list and the at least one RN to form the candidate donor site list. Optionally, the first RN may further obtain, through signal measurement, a communications site having only a capability of accessing a multi-hop RN.

(12) The first RN selects the first communications site based on signal quality information of communications sites included in the candidate donor site list.

The candidate donor site list includes the first communications site.

Optionally, during specific implementation, step (12) may include: estimating signal strength of cells provided by communications sites in the candidate donor site list; comprehensively considering identity information of the communications sites to which the estimated cells belong and priorities of working frequencies of the estimated cells; and selecting a communications site having a highest priority from the candidate donor site list as the first communications site. A priority of a communications site may be determined by using one or a combination of the following principles: a. A priority of a donor eNodeB is higher than that of an RN. b. A priority of an RN having a small hop count is higher than that of an RN having a large hop count. c. A priority of a communications site to which a cell having good signal quality belongs is higher than that of a communications site to which a cell having poor signal quality belongs. d. A priority of a communications site to which a cell having a high working frequency priority belongs is higher than that of a communications site to which a cell having a low working frequency priority belongs.

For example, if the candidate donor site list includes a donor eNodeB 1, a donor eNodeB 2, an RN 1, and an RN 2, the first RN selects the first communications site from the donor eNodeB 1, the donor eNodeB 2, the RN 1, and the RN 2 based on signal quality information of the donor eNodeB 1, the donor eNodeB 2, the RN 1, and the RN 2.

A manner in which the first RN selects the first communications site from the candidate donor site list may be specifically either of Manner 1 and Manner 2.

Manner 1: The first communications site is a communications site having best signal quality in the communications sites included in the candidate donor site list.

It should be noted that, for ease of description, signal quality of a communications site in the embodiments of this application may be understood as signal quality of a cell provided by the communications site.

Specifically, the first RN may determine the communications site having best signal quality in the communications sites included in the candidate donor site list as the first communications site. Manner 1 can improve communication quality of the first RN.

Manner 2: The first communications site is a communications site having a best comprehensive indicator in the communications sites included in the candidate donor site list, or the first communications site is a communications site that has a comprehensive indicator greater than or equal to a first preset value and that has signal strength greater than a second preset value in the communications sites included in the candidate donor site list, or the first communications site is a communications site having a best comprehensive indicator in communications sites having signal strength higher than a second preset value in the candidate donor site list.

A comprehensive indicator of a communications site is a result obtained after signal quality of the communications site is calculated according to a preset rule. The first preset value and the second preset value may be preset based on an actual network running status or according to another preset rule.

Specifically, a corresponding weighted value may be allocated to each of donor eNodeBs and RNs in the candidate donor site list. A hop count of each RN may also be considered when the corresponding weighted value is allocated to the RN. A comprehensive indicator of the donor eNodeB is obtained by multiplying signal quality of the donor eNodeB (or a value obtained after conversion of signal quality of the donor eNodeB) included in the candidate donor site list by the corresponding weighted value. A comprehensive indicator of the RN is obtained by multiplying signal quality of the RN (or a value obtained after conversion of signal quality of the RN) included in the candidate donor site list by the corresponding weighted value.

For example, assuming that the candidate donor site list includes a donor eNodeB 1, a donor eNodeB 2, an RN 1, and an RN 2, signal quality of the donor eNodeB 1, the donor eNodeB 2, the RN 1, and the RN 2 is respectively a, b, c, and d, a weight assigned to each of the donor eNodeB 1 and the donor eNodeB 2 is n, and a weight assigned to each of the RN 1 and the RN 2 is m, comprehensive indicators of the donor eNodeB 1, the donor eNodeB 2, the RN 1, and the RN 2 are respectively na, nb, mc, and md. If a larger comprehensive indicator indicates better signal quality of a communications site, the first RN may select a communications site corresponding to a largest value in na, nb, mc, and md as the first communications site; or the first RN may select a communications site corresponding to a value that is in na, nb, mc, and md and that is greater than or equal to the first preset value and having signal strength greater than the second preset value as the first communications site; or the first RN may select a communications site having a best comprehensive indicator from communications sites having signal strength greater than the second preset value as the first communications site. In this case, for comprehensive indicators corresponding to the communications sites in the candidate donor site list, refer to Table 1.

TABLE 1

| Communications sites in a candidate donor site list | Comprehensive indicators |
|---|---|
| Donor eNodeB 1 | na |
| Donor eNodeB 2 | nb |
| RN 1 | mc |
| RN 2 | md |

For another example, assuming that the candidate donor site list includes a donor eNodeB 1, a donor eNodeB 2, an RN 1, and an RN 2, signal quality of the donor eNodeB 1, the donor eNodeB 2, the RN 1, and the RN 2 is respectively a, b, c, and d, hop counts of the RN 1 and the RN 2 are respectively x and y, a weighted value assigned to each of the donor eNodeB 1 and the donor eNodeB 2 is n, and weighted values assigned to the RN 1 and RN 2 based on the hop counts are respectively f(x) and f(y), comprehensive indicators of the donor eNodeB 1, the donor eNodeB 2, the RN 1, and the RN 2 are respectively n*g(a), n*g(b), f(x)*g(c), and f(y)*g(d), where g(a), g(b), g(c), and g(d) respectively represent values obtained after conversion of the signal quality of the donor eNodeB 1, the donor eNodeB 2, the RN 1, and the RN 2. If a larger comprehensive indicator indicates better signal quality of a communications site, the first RN may select a communications site corresponding to a largest value in n*g(a), n*g(b), f(x)*g(c), and f(y)*g(d) as the first communications site; or the first RN may select a communications site corresponding to a value that is in n*g(a), n*g(b), f(x)*g(c), and f(y)*g(d) and that is greater than or equal to the first preset value and having signal strength greater than the second preset value as the first communications site; or the first RN may select a communications site having a best comprehensive indicator from communications sites having signal strength greater than the second preset value as the first communications site. "*" indicates "multiplied by". In this case, for comprehensive indicators corresponding to the communications sites in the candidate donor site list, refer to Table 2.

TABLE 2

| Communications sites in a candidate donor site list | Comprehensive indicators |
|---|---|
| Donor eNodeB 1 | n*g(a) |
| Donor eNodeB 2 | n*g(b) |
| RN 1 | f(x)*g(c) |
| RN 2 | f(y)*g(d) |

It may be understood that the foregoing manners of determining the first communications site may be used to select the first communications site on a frequency. When the plurality of communications sites included in the candidate donor site list work on a plurality of frequencies, based on priorities of the frequencies, a communications site having best signal quality on a frequency having a highest frequency priority may be selected as the first communications site; or a communications site having a best comprehensive indicator on a frequency having a highest frequency priority may be selected as the first communications site; or a communications site having a comprehensive indicator greater than or equal to the first preset value on a frequency that has a highest frequency priority and having signal strength greater than the second preset value may be selected as the first communications site; or a communications site having a best comprehensive indicator on a frequency having a highest frequency priority may be selected from communications sites having signal strength greater than the second preset value as the first communications site.

(13) The first RN camps on the cell provided by the first communications site.

After step (13), the first RN may initiate an access process on the camped cell.

The first RN accesses the first communications site based on the site type of the first communications site providing the camped cell. When the site type of the first communications site is a common base station, after accessing the first communications site by using the existing access process by using two steps (for details, refer to FIG. 4), the first RN disconnects from the first communications site and then accesses a donor eNodeB. When the site type of the first communications site is an RN, and the first communications site has a capability of accessing a multi-hop RN, the first RN accesses the first communications site in an RN mode. That the first RN accesses the first communications site in an RN mode is specifically that the first RN accesses the first communications site by using an access process by using one step. To be specific, the first RN initiates access to the first communications site in the camped cell, and further carries the first indication information in an air interface control plane connection setup process. Optionally, if the air interface control plane connection is successfully set up, the first communications site may forward the first indication information to a communications site connected to the first communications site.

Figure 6:
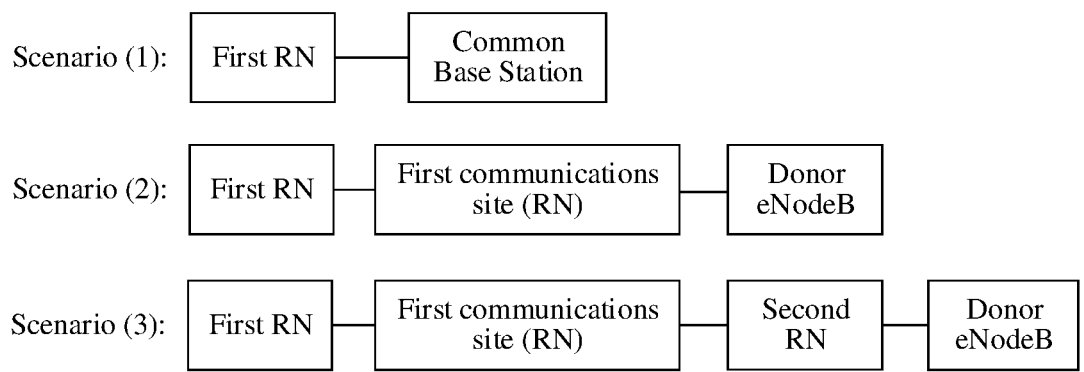
FIG. 6 is a schematic diagram of scenarios of connections between communications sites according to an embodiment of this application.

For example, refer to FIG. 6, in a scenario (1), the site type of the first communications site is a common base station, and the first RN accesses the first communications site in the UE mode. In a scenario (2) and a scenario (3), the site type of the first communications site is an RN. In the scenario (2), the first communications site may be directly connected to a donor eNodeB. In the scenario (3), the first communications site may alternatively be connected to a donor eNodeB by using one or more other RNs (a second RN is shown in the figure).

In a scenario including a plurality of hops of RNs, the first RN accesses a network by using the first communications site. The first communications site has set up a connection to a donor eNodeB and a connection to a core network (CN) entity serving an RN. Therefore, the first RN does not need to obtain RN-related configuration information such as the donor eNodeB list by using the first step (to be specific, accessing the network as a common UE) in the conventional access process by using two steps. Provided that the first RN can identify that a cell on which the first RN currently camps is provided by the first communications site, the first RN may be directly used as an RN to initiate an access process to the first communications site, to access the first communications site, and further access a CN, so that access to the network is implemented by using one step, and an access process is simplified. In this case, the first RN needs to obtain prior information (for example, the second indication information or the identity information of the first communications site), and determine, based on the prior information, whether the site type of the first communications site is an RN having a capability of accessing a multi-hop RN.

By using the foregoing embodiment, the first RN may obtain the candidate donor site list, and select, from the candidate donor site list, an RN most suitable for the first RN to access, to camp on a cell provided by the RN. On one hand, a site type of an accessed site can be comprehensively considered, and a communications site having a small hop count is preferentially selected. On the other hand, a case in which conventional UE may need to perform cell reselection for a plurality of times to select a most suitable cell is avoided, so that efficiency of an access process is increased. Even if the first RN cannot obtain the candidate donor site list, when the camped cell is provided by an RN, the first RN may access a network by using one step by reading a broadcast signal of a camped cell, so that an access process is simplified. Certainly, the communications site selected by the first RN from the candidate donor site list may alternatively be a donor eNodeB. This is not specifically limited in this embodiment of this application.

A base station is connected to a relay node, so that a signal coverage area can be expanded. In the method provided in this embodiment of this application, the first communications site accessed by the first RN may be an RN, and two hops of RNs are at least deployed in a network. Therefore, compared with a scenario in which a single hop of RN is deployed in the prior art, a larger signal coverage area can be expanded, and a larger network capacity can be increased. In addition, an RN has a wireless self-backhauling function, so that costs of trenching and cable burying when a wired backhaul link is deployed in a conventional base station, deployment flexibility is improved, and the RN is particularly applicable to spreading, in an initial stage, of a 5G network and a network of an evolved communications system.

Figure 7:
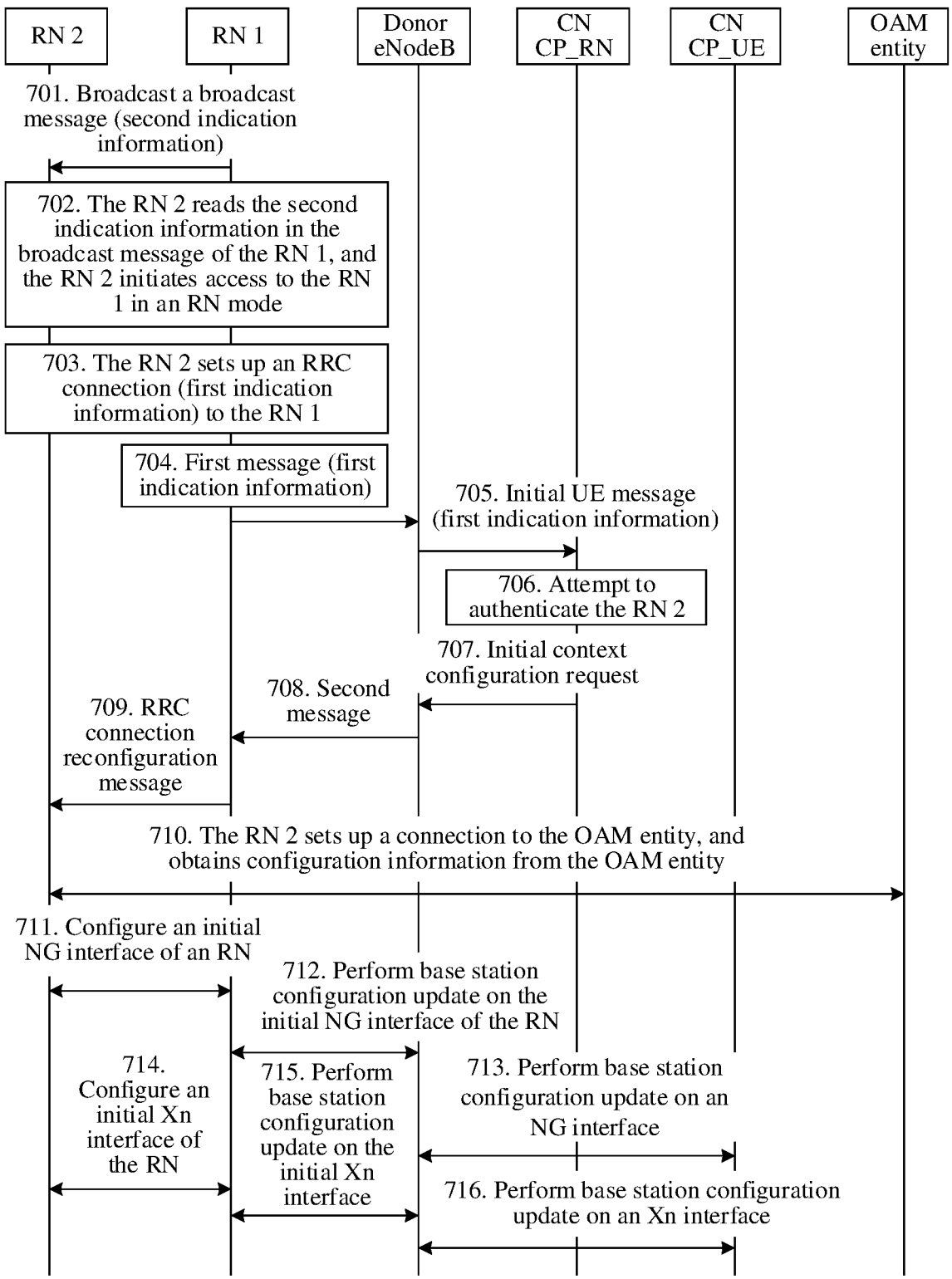
FIG. 7 is a flowchart of another network access method according to an embodiment of this application.

For example, referring to FIG. 7, the first RN is an RN 2, the first communications site is an RN 1, and the method provided in the foregoing embodiment may specifically include the following steps.

701. The RN 1 broadcasts a broadcast message.

The broadcast message includes second indication information, where the second indication information is used to indicate that a site type of the RN 1 is an RN. For example, the broadcast message may be system information.

702. The RN 2 reads the second indication information in the broadcast message of the RN 1, and the RN 2 initiates access to the RN 1 in an RN mode.

After the RN 2 reads the second indication information in the broadcast message of the RN 1, the RN 2 learns that the site type of the RN 1 is an RN.

703. The RN 2 sets up an RRC connection to the RN 1.

In a process of setting up the RRC connection, the RN 2 sends first indication information to the RN 1, where the first indication information carries information indicating that the site type of the RN 2 is an RN.

For example, the first indication information may be carried by using an RRC message, for example, carried by using an RRC connection setup request or RRC connection setup complete message. The first indication information may alternatively be represented by using a physical signal feature, for example, one or a combination of information: a preamble, a beam, an air interface format (numerology), and the like that are used for random access.

704. The RN 1 sends a first message to a donor eNodeB, where the first message carries the first indication information.

Optionally, the first message may be an RRC message between the RN 1 and the donor eNodeB or an initial UE message generated by the RN 1 for the RN 2.

705. The donor eNodeB sends the initial UE message to a control plane (CP) of a CN providing a service for an RN.

In FIG. 7, a CN CP_RN refers to a control plane function of the CN serving the RN, the initial UE message includes information such as the first indication information and an identifier of the RN 2, and the initial UE message is used to notify a CN that one RN needs to be attached to a network.

706. The CN CP_RN attempts to authenticate the RN 2, and if the authentication succeeds, the following steps 707 to 716 are performed.

707. The CN CP_RN sends an initial context configuration request (initial context setup request) to the donor eNodeB, where the request is used to set up a context of the RN 2 in the donor eNodeB, and set up a data transmission channel, for the RN 2, between the donor eNodeB and the CN.

The initial context configuration request may include a quality of service (QoS) rule, a session ID (identifier), and information related to user plane data transmission channel setup.

708. The donor eNodeB sends a second message to the RN 1, where the second message is used to transfer configuration information of the CN and/or the donor eNodeB for the RN 2, and set up a data transmission channel between the RN 1 and the donor eNodeB for the RN 2.

The second message may include one or a combination of the following information: the QoS rule, the session ID, and the information related to user plane data transmission channel setup.

709. The RN 1 sends an RRC connection reconfiguration message to the RN 2, where the message is used to transfer configuration information of the donor eNodeB and/or the RN 1 for the RN 2, and set up an air interface data transmission resource between the RN 2 and the RN 1 for the RN 2.

Step 702 to step 709 are a process in which the RN 2 is attached to the network.

Optionally, after step 709, the method may further include one or more of the following steps.

710. The RN 2 sets up a connection to the OAM entity, and obtains configuration information from the OAM entity.

For example, the configuration information includes one or a combination of the following information: an evolved universal mobile telecommunications system terrestrial radio access network cell global identifier (ECGI) of a cell, a donor eNodeB list, and the like of the RN 2.

711. The RN 2 and the RN 1 configure an initial next generation (NG) interface of the RN, to set up an NG interface for UE served by the RN 2 to communicate an NG message.

712. The RN 1 and the donor eNodeB perform base station configuration update on the initial NG interface of the RN, to set up the NG interface for the UE served by the RN 2 to communicate an NG message.

713. The donor eNodeB and a CN CP_UE perform base station configuration update on an NG interface, to set up the NG interface for the UE served by the RN 2 to communicate an NG message.

The CN CP_UE refers to a control plane function of a CN serving UE.

714. The RN 2 and the RN 1 configure an initial Xn interface of the RN, to set up an Xn interface for the UE served by the RN 2 to communicate an Xn message.

The NG interface is an interface between the donor eNodeB and the CN, and may alternatively be an S1 interface or another similar interface. The Xn interface is an interface between the donor eNodeB and the RN or between RNs, and may alternatively be an X2 interface or another similar interface.

715. The RN 1 and the donor eNodeB perform base station configuration update on the initial Xn interface, to set up the Xn interface for the UE served by the RN 2 to communicate an Xn message.

716. The donor eNodeB and the CN CP_UE perform base station configuration update on an Xn interface, to set up the Xn interface for the UE served by the RN 2 to communicate an Xn message.

The RN 2 can provide an access service for the UE only after step 716.

To balance load, resources, and the like in the network, before the RN accesses the network, access control further needs to be performed for the RN. Different from access control of UE in the prior art, the RN itself does not have features, for example, an access class, an access type, and an application type, of the UE. Therefore, an access control parameter and an access control mechanism that are provided for access of the UE in the prior art are no longer applicable to a scenario of RN access. The embodiments of this application further provide an access control method. Specifically, in Embodiment 1 and Embodiment 2 provided below, an access control method in a scenario in which a first RN accesses a first communications site is described, where a site type of the first communications site is an RN or a donor eNodeB. In Embodiment 3 and Embodiment 4, an access control method in a scenario in which a third RN accesses a first RN is described.

Embodiment 1

In this embodiment, the first RN determines by itself whether the first RN can access the first communications site, so that the first RN can more flexibly perform access control.

Figure 8:
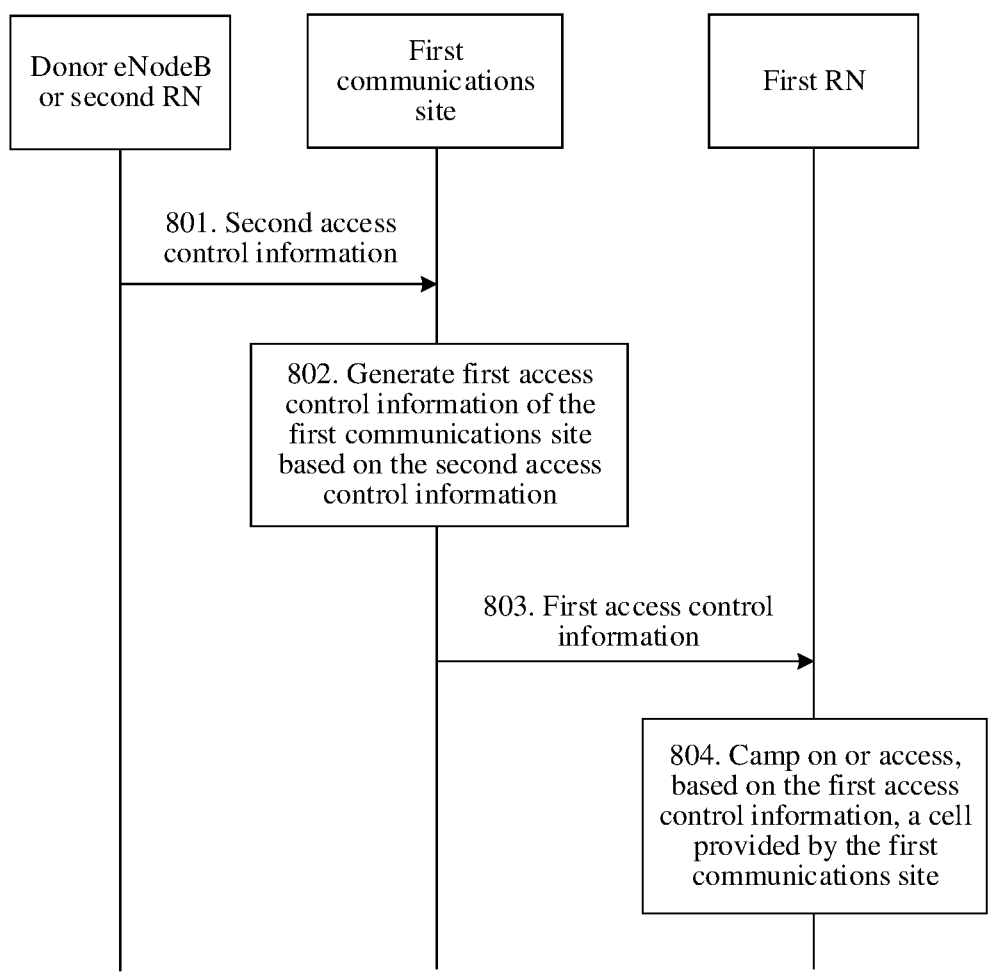
FIG. 8 is a flowchart of an access control method according to an embodiment of this application.

Referring to FIG. 8, when the first communications site is an RN, the method may include the following steps.

801. A first communications site receives second access control information sent by a donor eNodeB or a second RN.

Specifically, when the first communications site is directly connected to the donor eNodeB (referring to the scenario (2) in FIG. 6), the first communications site receives the second access control information sent by the donor eNodeB. In this case, the second access control information is access control information of the donor eNodeB. When the first communications site is directly connected to the second RN (refer to the scenario (3) in FIG. 6), the first communications site receives the second access control information sent by the second RN. In this case, the second access control information is access control information of the second RN. The second RN may be connected to the donor eNodeB directly or by using another RN.

Optionally, the second access control information of the second RN includes at least one of the following information: an RN-specific cell bar parameter, a hop count of an RN allowed to access the second RN, a total quantity of RNs allowed to access the second RN, load that the second RN can bear, a type of the RN allowed to access the second RN, and an indication indicating whether access is allowed. The second access control information of the donor eNodeB includes at least one of the following information: the RN-specific cell bar parameter, a hop count of an RN allowed to access the donor eNodeB, a total quantity of RNs allowed to access the donor eNodeB, load that the donor eNodeB can bear, a type of the RN allowed to access the donor eNodeB, and an indication indicating whether access is allowed.

A quantity of RNs between UE accessing the first RN and a donor eNodeB can be controlled by performing access control on a hop count of an RN of an accessed communications site. An excessively long latency of communication between the UE and the donor eNodeB can be prevented by properly setting the hop count of the RN of the accessed communications site. Network load can be controlled by performing access control on a total quantity of RNs of the accessed communications site. Network overload and resource congestion can be prevented by properly setting the total quantity of the RNs. By performing access control on load of the accessed communications site, the load of the accessed site can be controlled, and overload of the accessed communications site can be prevented from affecting processing efficiency of the accessed communications site.

The RN-specific cell bar parameter may be a cell bar parameter specially set for an RN. A communications site may set a cell bar parameter for an RN, to directly affect whether the RN can camp on a cell provided by the communications site. For example, if the first RN reads that an RN-specific cell bar parameter in access control information of a communications site is barring access, it is determined that the first RN cannot camp on a cell provided by the communications site; otherwise, it is determined that the first RN can camp on a cell provided by the communications site. When it is determined that the first RN cannot camp on the cell provided by the communications site, the first RN performs cell selection/reselection.

A communications site may further set an indication indicating whether access is allowed for an RN, to directly affect whether the RN can access a cell provided by the communications site. Load that a communications site can bear may be a quantity of users who can access the communications site, a data volume, a quantity of RRC connections, and the like. A type of an RN may be specifically information such as an operator to which the RN belongs, a slice type of the RN, and a tenant type of the RN.

802. The first communications site generates first access control information of the first communications site based on the second access control information.

Specifically, when the first access control information includes a hop count of an RN allowed to access the first communications site, the hop count of the RN allowed to access the first communications site may be obtained by subtracting 1 from the hop count, included in the second access control information, of the RN allowed access. When the first access control information includes a total quantity of RNs allowed to access the first communications site, the total quantity of the RNs allowed to access the first communications site may be obtained by subtracting a quantity of RNs of a communications site directly connected to the first communications site (herein, "a communications site directly connected to the first communications site" is a communications site accessed by the first communications site) from the total quantity, included in the second access control information, of the RNs allowed access. When the first access control information includes other information, the first communications site may directly determine the received second access control information as access control information of the first communications site.

For example, Table 3 shows a table of a correspondence between methods for obtaining the first access control information by the first communications site through processing and the first access control information.

on the hop count of the RN allowed to access the donor eNodeB. An RN i broadcasts a hop count of an RN allowed to access the RN i to an RN i+1, and the RN i+1 accesses the RN i based on the hop count of the RN allowed to access the RN i. If the hop count of the RN allowed to access the donor eNodeB is n, the hop count of the RN allowed to access the RN i is n−1, and a hop count, received by an RN n, of an RN allowed to access an RN n−1 is 1. An initial value of i is 1. It should be noted that if the RN 1 has accessed the donor eNodeB, the donor eNodeB may send access control information of the donor eNodeB to the RN 1 by using dedicated signaling. Similarly, if an RRC connection has been set up between two RNs, access control information of the RNs may be transmitted between the two RNs by using dedicated signaling.

803. The first communications site sends the first access control information to the first RN.

Optionally, the first access control information may be included in a broadcast message or RRC dedicated signaling of the first communications site.

804. The first RN receives first access control information sent by the first communications site; and camps on or accesses, based on the first access control information, a cell provided by the first communications site.

Optionally, the first access control information includes at least one of the following information: an RN-specific cell bar parameter, a hop count of an RN allowed to access the first communications site, a total quantity of RNs allowed to access the first communications site, load that the first communications site can bear, a type of the RN allowed to access the first communications site, and an indication indicating whether access is allowed.

For example, during specific implementation of step 804, when the RN-specific cell bar parameter included in the first access control information is set to allowing access, the first RN camps on the cell provided by the first communications site. Further optionally, the first RN directly initiates access to the first communications site, or determines, based on another parameter in the first access control information, whether the first RN may initiate access to the first communications site. When the RN-specific cell bar parameter included in the first access control information is set to barring access, the first RN does not camp on the cell provided by the first communications site, and selects, through cell selection/reselection, another cell satisfying a camping condition.

For example, during specific implementation of step 804, the hop count, included in the first access control information, of the RN allowed to access the first communications

TABLE 3

| First access control information | Methods for obtaining the first access control information by a first communications site through processing |
|---|---|
| Hop count of an RN allowed to access the first communications site | Subtract 1 from the hop count, included in second access control information, of the RN allowed access |
| Total quantity of RNs allowed to access the first communications site | Subtract a quantity of RNs of a communications site directly connected to the first communications site from the total quantity, included in the second access control information, of the RNs allowed access |

Figure 9:
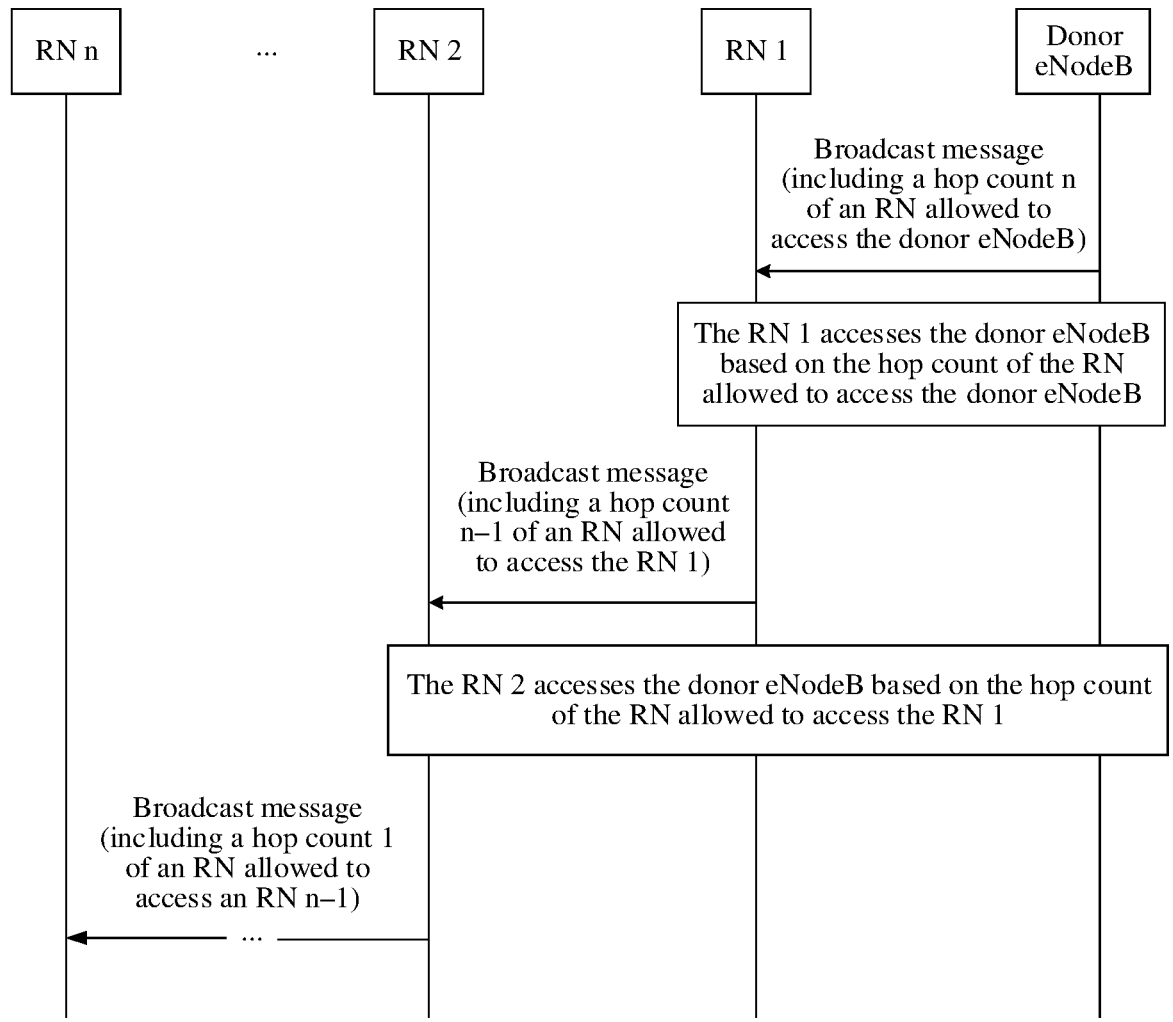
FIG. 9 is a flowchart of transferring a hop count between communications sites according to an embodiment of this application.

For example, FIG. 9 shows an example in which a donor eNodeB and RNs each send a hop count of an RN allowed access to a next hop of RN. The donor eNodeB broadcasts a hop count of an RN allowed to access the donor eNodeB to an RN 1, and the RN 1 accesses the donor eNodeB based site is not 0, and the first RN determines that the first RN may initiate access to the first communications site. The total quantity, included in the first access control information, of the RNs allowed to access the first communications site is not 0, the first RN determines that the first RN may initiate access to the first communications site. The load that the first communications site can bear and that is included in the first access control information is greater than or equal to planning load of the first RN, and the first RN determines that the first RN may initiate access to the first communications site, where the planning load of the first RN may be load of the first RN that is planned in advance. For example, the load may be a quantity of users who can access the first RN. When the type, included in the first access control information, of the RN allowed to access the first communications site includes a type of the first RN, the first RN determines that the first RN may initiate access to the first communications site. When the indication, included in the first access control information, indicating whether access is allowed is an indication indicating that access is allowed, the first RN determines that the first RN may initiate access to the first communications site. In other cases, the first RN determines not to initiate access to the first communications site.

For example, Table 4 shows a table of a correspondence between conditions of determining, by the first RN, to initiate access to the first communications site and the first access control information.

TABLE 4

| First access control information | Determining conditions of determining, by a first RN, to initiate access to a first communications site |
|---|---|
| Hop count of an RN allowed to access the first communications site | The hop count of the RN allowed to access the first communications site is not o |
| Total quantity of RNs allowed to access the first communications site | The total quantity of the RNs allowed to access the first communications site is not o |
| Load that the first communications site can bear | The load that the first communications site can bear is greater than or equal to planning load of the first RN |
| Type of the RN allowed to access the first communications site | The type of the RN allowed to access the first communications site includes a type of the first RN |
| Indication indicating whether access is allowed | Indication indicating that access is allowed |

This specification provides only a method for accessing, by the first RN, the first communications site based on the first access control information in an example. During specific implementation, the first RN may further determine, by using another determining condition based on the first access control information, whether the first RN accesses the first communications site.

It should be noted that the first RN receives the first access control information sent by the first communications site, and may also receive access control information that is sent by the first communications site and that is intended for common UE. An action of the first RN may be ignoring the access control information intended for the common UE. The common UE may also receive the first access control information sent by the first communications site. Behavior of the common UE may be ignoring the first access control information. Through clarification of the behavior of the first RN and the common UE, the network can make and determine relatively independent access control parameters for both the common UE and the RN.

For explanations of content that is related to the foregoing description and that is in the following description, refer to the specific explanations in the foregoing description. Details are not described again in corresponding parts in the following description.

Figure 10:
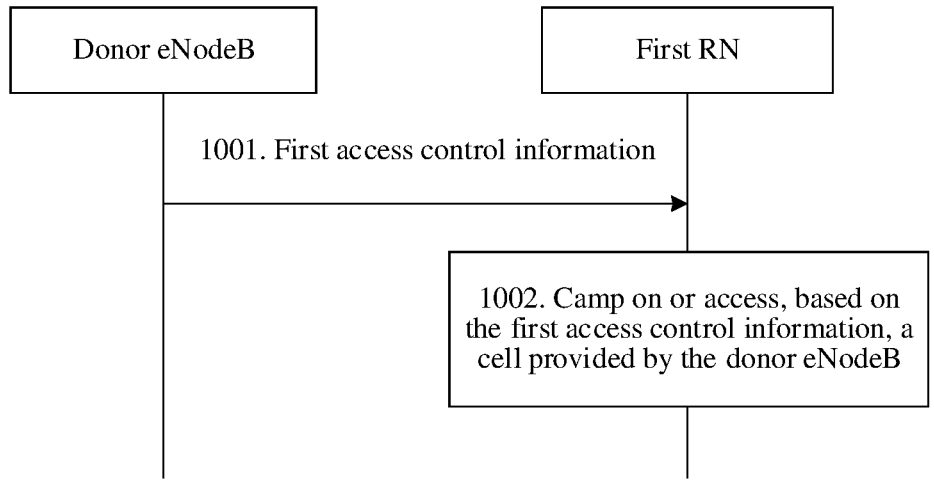
FIG. 10 is a flowchart of another access control method according to an embodiment of this application.

Referring to FIG. 10, when the first communications site is a donor eNodeB, the method may include the following steps.

1001. The donor eNodeB sends first access control information of the donor eNodeB to the first RN.

In this case, the first access control information may be access control information of the donor eNodeB.

Optionally, the first access control information includes at least one of the following information: an RN-specific cell bar parameter, a hop count of an RN allowed to access the donor eNodeB, a total quantity of RNs allowed to access the donor eNodeB, load that the donor eNodeB can bear, a type of the RN allowed to access the donor eNodeB, and an indication indicating whether access is allowed.

Optionally, the donor eNodeB may send the first access control information of the donor eNodeB to the first RN by using a broadcast message or RRC dedicated signaling.

1002. The first RN receives the first access control information sent by the donor eNodeB, and camps on or accesses, based on the first access control information, a cell provided by the donor eNodeB.

A method for determining, by the first RN based on the first access control information, whether to camp on or access the cell provided by the donor eNodeB is similar to the foregoing method for determining, by the first RN, whether to camp on or access the cell provided by the first communications site. Details are not described herein again.

In this embodiment, after the first RN determines not to initiate access to the first communications site, the first RN performs cell selection/reselection again.

Embodiment 2

In this embodiment, the first communications site determines whether to allow the first RN to access the first communications site, so that a network can control access of the first RN.

Figure 11:
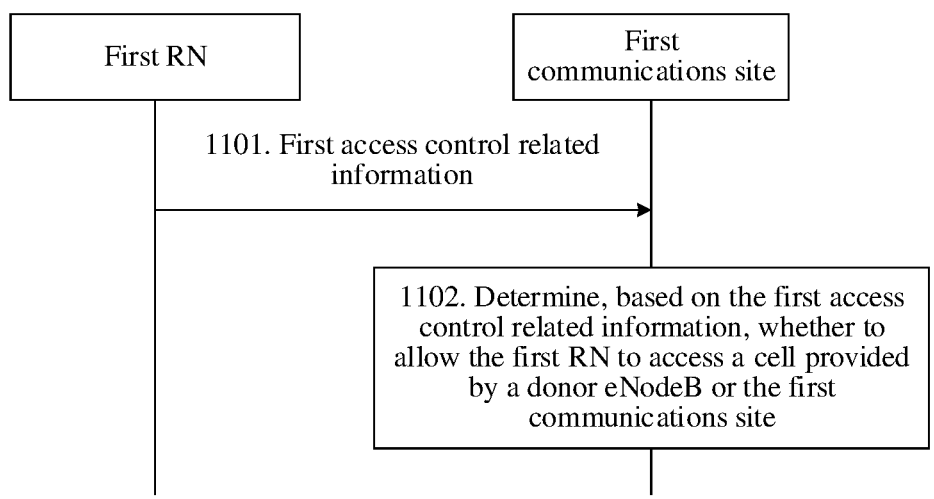
FIG. 11 is a flowchart of another access control method according to an embodiment of this application.

Referring to FIG. 11, the method may include the following steps.

1101. The first RN sends first access control related information to the first communications site.

Optionally, the first access control related information includes at least one of the following information: a hop count of the first RN, load of the first RN, and a type of the first RN. By performing access control on a hop count of an RN, a quantity of RNs between UE accessing an RN and a donor eNodeB can be controlled, and an excessively long latency of communication between the UE and the donor eNodeB can be prevented. By performing access control on load of the RN, network load can be controlled, and network overload and resource congestion can be prevented.

Specifically, the first RN may send the first access control related information of the first RN to the first communications site in a random access and RRC connection setup process. For example, the first RN may determine the hop count of the first RN based on a broadcast message of the first communications site or in another manner, thereby carrying hop count information of the first RN when accessing the first communications site. Alternatively, the first RN indicates that the first RN is an RN, and when the first communications site forwards the information indicating that the first RN is an RN to the donor eNodeB or another communications site, a hop count of the first communications site is added. Alternatively, the donor eNodeB or another communications site may determine the hop count of the first RN in an implicit manner, to be specific, through message transfer. For example, each time the RN forwards data, the RN adds an identifier of the RN to the data, or encapsulates the data once, so that when parsing a message, the donor eNodeB or the another communications site may determine, by using the identifier carried in a data packet or an encapsulation format, a hop count of an RN sending the message.

When the first communications site is a donor eNodeB, or a donor eNodeB directly or indirectly connected to the first communications site determines whether to allow the first RN to access the first communications site, step 1102 is performed.

1102. A donor eNodeB receives the first access control related information sent by the first RN, and determines, based on the first access control related information, whether to allow the first RN to access a cell provided by the donor eNodeB or the first communications site, where the first communications site is an RN connected to the donor eNodeB.

When the donor eNodeB is the first communications site, the donor eNodeB may directly receive the first access control related information sent by the first RN, and the donor eNodeB determines, based on the first access control related information, whether to allow the first RN to access the cell provided by the donor eNodeB. When the donor eNodeB is the donor eNodeB directly or indirectly connected to the first communications site, the donor eNodeB may receive, by using the first communications site, the first access control related information sent by the first RN, and the donor eNodeB determines, based on the first access control related information, whether to allow the first RN to access the cell provided by the first communications site.

Optionally, during specific implementation of step 1102, when the first access control related information includes the hop count of the first RN, if a maximum hop count of an RN allowed to access the donor eNodeB is greater than or equal to the hop count of the first RN, the donor eNodeB allows the first RN to access a cell provided by the donor eNodeB or the first communications site. When the first access control related information includes the load of the first RN, if load that the donor eNodeB can bear is greater than or equal to planning load of the first RN, the donor eNodeB allows the first RN to access a cell provided by the donor eNodeB or the first communications site. When the first access control related information includes the type of the first RN, if a type of an RN allowed to access the donor eNodeB includes the type of the first RN, the donor eNodeB allows the first RN to access a cell provided by the donor eNodeB or the first communications site.

For example, Table 5 shows a table of a correspondence between determining conditions of allowing, by the donor eNodeB, the first RN to access the cell provided by the donor eNodeB or the first communications site and the first access control related information.

TABLE 5

| First access control related information | Determining conditions of allowing, by a donor eNodeB, a first RN to access a cell provided by the donor eNodeB or a first communications site |
|---|---|
| Hop count of the first RN | A maximum hop count of an RN allowed to access the donor eNodeB is greater than or equal to the hop count of the first RN |
| Load of the first RN | Load that the donor eNodeB can bear is greater than or equal to planning load of the first RN |
| Type of the first RN | A type of an RN allowed to access the donor eNodeB includes the type of the first RN |

For example, the first RN may determine the hop count of the first RN based on the broadcast message of the first communications site or in the another manner, thereby carrying the hop count information of the first RN when accessing the first communications site.

When the first communications site is an RN, and the first communications site determines whether to allow the first RN to access the cell provided by the first communications site, the first communications site may determine, based on access control information of the first communications site and the first access control related information, whether to allow the first RN to access the first communications site. A method for determining, by the first communications site, whether to allow the first RN to access the first communications site is similar to the method for determining, by the donor eNodeB, whether to allow the first RN to access the donor eNodeB in step 1102. Details are not described herein again.

The access control information of the first communications site may be obtained by processing received access control information of the donor eNodeB directly or indirectly connected to the first communications site. A specific processing method is similar to the method for generating, by the first communications site, the first access control information of the first communications site based on the second access control information in Embodiment 1. Details are not described herein again.

Figure 12:
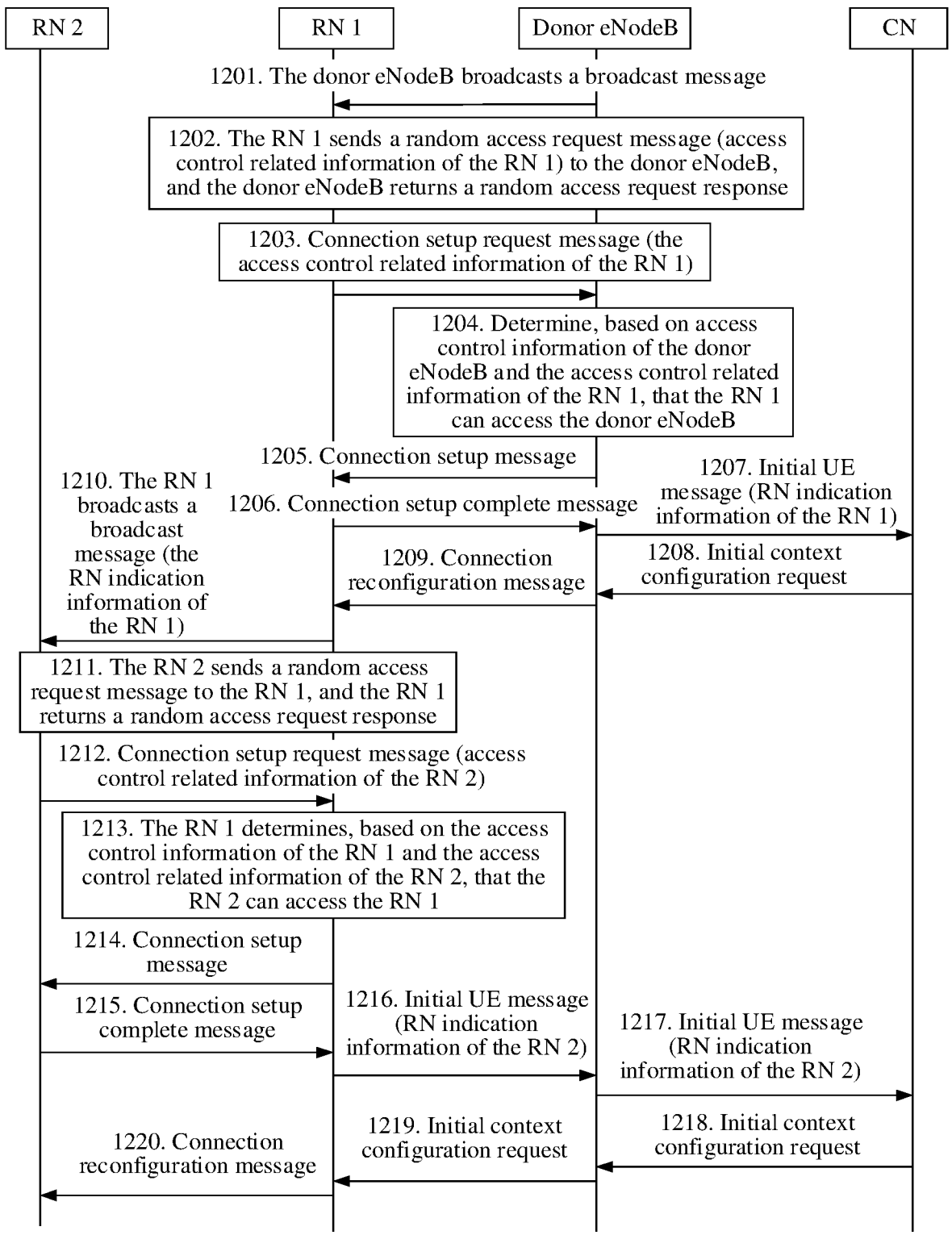
FIG. 12 is a flowchart of another access control method according to an embodiment of this application.

FIG. 12 shows a process of accessing, by the first RN (denoted as an RN 2), a donor eNodeB when the first communications site is an RN (denoted as an RN 1). The process specifically includes a process of accessing, by the RN 1, the donor eNodeB and a process of accessing, by the RN 2, the RN 1. The RN 1 determines, based on access control information of the RN 1 and access control related information of the RN 2, whether the RN 2 can access the RN 1. The process of accessing, by the RN 1, the donor eNodeB includes the following.

1201. The donor eNodeB broadcasts a broadcast message.

For example, the broadcast message may be specifically a system message.

1202. The RN 1 sends a random access request message to the donor eNodeB, and the donor eNodeB returns a random access request response.

Optionally, the RN 1 carries the access control related information of the RN 1 by using the random access request message. Specifically, the access control related information of the RN 1 may be implicitly or explicitly indicated by using one or a combination of the following information: a preamble, a beam, an air interface format, and the like that are used for random access.

1203. The RN 1 sends a connection setup request message to the donor eNodeB.

For example, the connection setup request message may be an RRC connection setup request message.

Optionally, the connection setup request message may include the access control related information of the RN 1.

1204. The donor eNodeB determines, based on access control information of the donor eNodeB and the access control related information of the RN 1, that the RN 1 can access the donor eNodeB.

Optionally, a manner of obtaining, by the donor eNodeB, the access control information may be one or a combination of the following manners: an OAM entity configures the access control information for the donor eNodeB; a CN control plane entity configures the access control information for the donor eNodeB by using an NG/S1 interface message; and a network manager configures the access control information for the donor eNodeB by using a management plane interface.

During specific implementation of step 1204, if the donor eNodeB determines, based on the access control information of the donor eNodeB and the access control related information of the RN 1, that the RN 1 cannot access the donor eNodeB, the donor eNodeB sends an access reject message to the RN 1. For example, the access reject message may be an RRC connection reject message.

1205. The donor eNodeB sends a connection setup message to the RN 1.

For example, the connection setup message may be an RRC connection setup message.

1206. The RN 1 sends a connection setup complete message to the donor eNodeB.

For example, the connection setup complete message may be an RRC connection setup complete message.

1207. The donor eNodeB sends an initial UE message to a CN.

For example, the initial UE message may be an initial UE message of the NG/S1 interface control plane.

Optionally, the initial UE message includes RN indication information of the RN 1.

1208. The donor eNodeB receives an initial context configuration request sent by the CN.

1209. The donor eNodeB sends a connection reconfiguration message to the RN 1.

For example, the connection reconfiguration message may be an RRC connection reconfiguration message.

Optionally, after completing reconfiguration, the RN 1 sends a reconfiguration complete message to the donor eNodeB, and the donor eNodeB sends an initial context configuration response message to the CN.

After setting up connections to a control plane and a user plane of the CN, the RN 1 may provide a service for UE and a next hop of RN. For example, the process of accessing, by the RN 2, the RN 1 includes the following steps.

1210. The RN 1 broadcasts a broadcast message.

For example, the broadcast message may be system information.

The broadcast message includes the RN indication information of the RN 1, where the RN indication information of the RN 1 is used to indicate that a type of the RN 1 is an RN.

1211. The RN 2 sends a random access request message to the RN 1, and the RN 1 returns a random access request response.

Optionally, the RN 2 carries the access control related information of the RN 2 by using the random access request message. Specifically, the access control related information of the RN 2 may be implicitly or explicitly indicated by using one or a combination of the following information: a preamble, a beam, an air interface format, and the like that are used for random access.

1212. The RN 2 sends a connection setup request message to the RN 1.

For example, the connection setup request message may be an RRC connection setup request message.

Optionally, the connection setup request message may include the access control related information of the RN 2.

1213. The RN 1 determines, based on the access control information of the RN 1 and the access control related information of the RN 2, that the RN 2 can access the RN 1.

Optionally, the access control information of the RN 1 may be obtained by processing obtained access control information of the donor eNodeB, or a manner of obtaining, by the RN 1, the access control information may be one or a combination of the following manners: the OAM entity configures the access control information for the RN 1; the CN control plane entity configures the access control information for the RN 1; the donor eNodeB configures the access control information for the RN 1; and the network manager configures the access control information for the RN 1 by using the management plane interface.

During specific implementation of step 1213, if the RN 1 determines, based on the access control information of the RN 1 and the access control related information of the RN 2, that the RN 2 cannot access the RN 1, the RN 1 sends an access reject message to the RN 2. For example, the access reject message may be an RRC connection reject message.

1214. The RN 1 sends a connection setup message to the RN 2. For example, the connection setup message may be an RRC connection setup message.

1215. The RN 2 sends a connection setup complete message to the RN 1.

For example, the connection setup complete message may be an RRC connection setup complete message.

1216. The RN 1 sends an initial UE message to the donor eNodeB.

The initial UE message includes RN indication information of the RN 2.

1217. The donor eNodeB sends the received initial UE message to the CN.

1218. The CN sends an initial context configuration request to the donor eNodeB.

1219. The donor eNodeB sends the received initial context configuration request to the RN 1.

1220. The RN 1 sends a connection reconfiguration message to the RN 2.

For example, the connection reconfiguration message may be an RRC connection reconfiguration message.

When another RN accesses the donor eNodeB, refer to the process of accessing, by the RN 2, the donor eNodeB.

Figure 13:
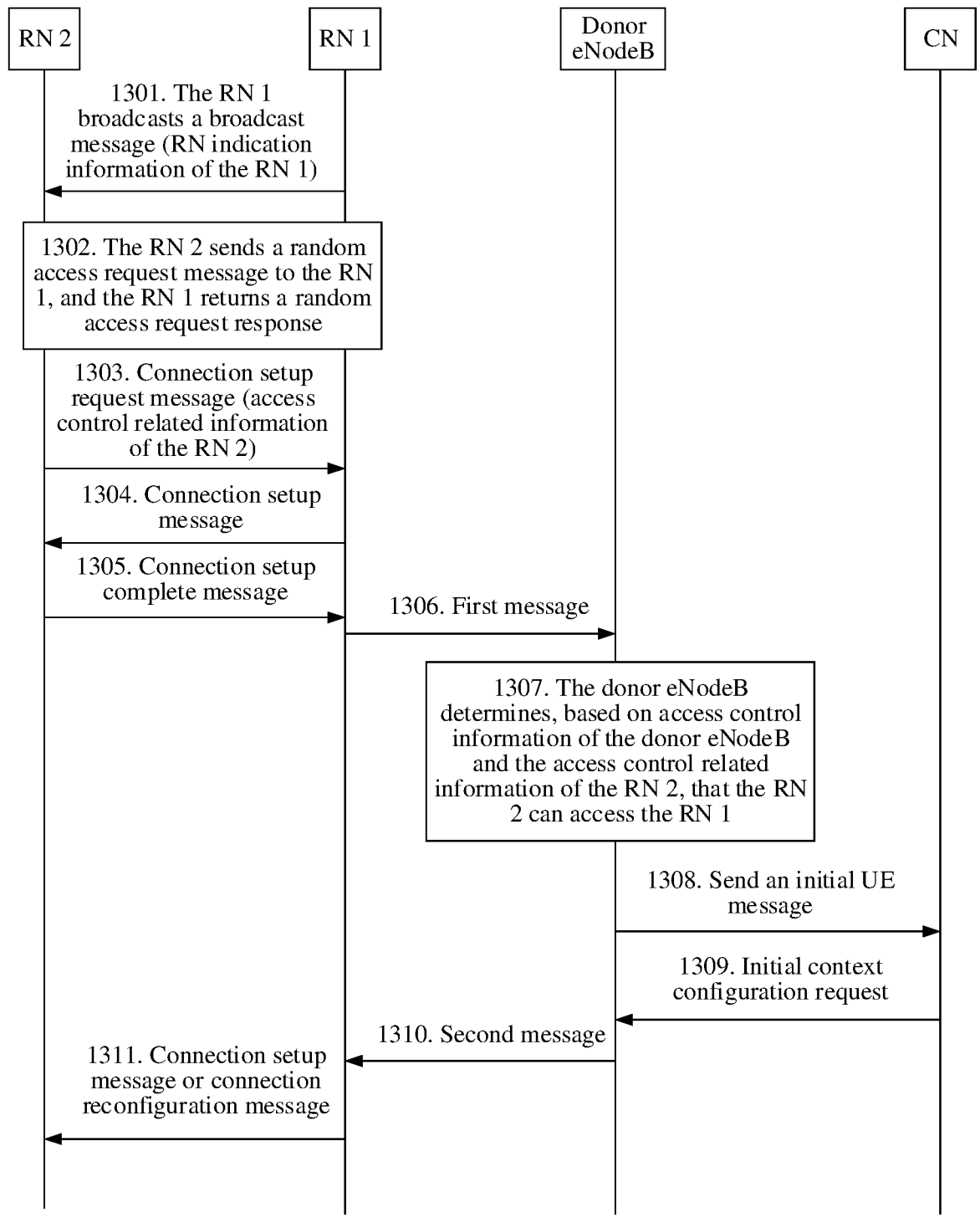
FIG. 13 is a flowchart of another access control method according to an embodiment of this application.

FIG. 13 shows a process of accessing, by the first RN (denoted as an RN 2), an RN 1 when the first communications site is an RN (denoted as the RN 1). A donor eNodeB connected to the RN 1 determines whether the RN 2 can access the RN 1.

Referring to FIG. 13, the method may include the following steps.

1301. The RN 1 broadcasts a broadcast message.

For example, the broadcast message may be system information.

The broadcast message includes RN indication information of the RN 1, where the RN indication information of the RN 1 is used to indicate that a type of the RN 1 is an RN.

1302. The RN 2 sends a random access request message to the RN 1, and the RN 1 returns a random access request response.

Optionally, the RN 2 carries access control related information of the RN 2 by using the random access request message. Specifically, the access control related information of the RN 2 may be implicitly or explicitly indicated by using one or a combination of the following information: a preamble, a beam, an air interface format, and the like that are used for random access.

1303. The RN 2 sends a connection setup request message to the RN 1.

For example, the connection setup request message may be an RRC connection setup request message.

Optionally, the connection setup request message includes the access control related information of the RN 2.

1304. The RN 1 sends a connection setup message to the RN 2.

For example, the connection setup message may be an RRC connection setup message.

1305. The RN 2 sends a connection setup complete message to the RN 1.

For example, the connection setup complete message may be an RRC connection setup complete message.

Optionally, the connection complete request message includes the access control related information of the RN 2.

1306. The RN 1 sends a first message to the donor eNodeB.

For example, the first message may be an initial UE message or an RRC message.

Optionally, the first message includes the access control related information of the RN 2.

1307. The donor eNodeB determines, based on access control information of the donor eNodeB and the access control related information of the RN 2, that the RN 2 can access the RN 1.

During specific implementation of step 1307, if the donor eNodeB determines, based on the access control information of the donor eNodeB and the access control related information of the RN 2, that the RN 2 cannot access the RN 1, the donor eNodeB sends an access reject message to the RN 2.

1308. The donor eNodeB sends an initial UE message to a CN.

The initial UE message may include RN indication information of the RN 2.

1309. The CN sends an initial context configuration request to the donor eNodeB.

1310. The donor eNodeB sends a second message to the RN 1, where the second message includes a part or all of information in the received initial context configuration request. For example, the second message may be an initial context configuration request or an RRC message.

1311. The RN 1 sends a connection setup message or a connection reconfiguration message to the RN 2.

When another RN accesses the donor eNodeB, refer to the process of accessing, by the RN 2, the donor eNodeB.

Embodiment 3

In this embodiment, the first RN determines whether to allow the third RN to access the first RN, so that whether the third RN accesses a network is controlled by the network, and a burden on a donor eNodeB can be reduced compared with a case in which the donor eNodeB determines whether to allow the third RN to access the first RN.

Figure 14:
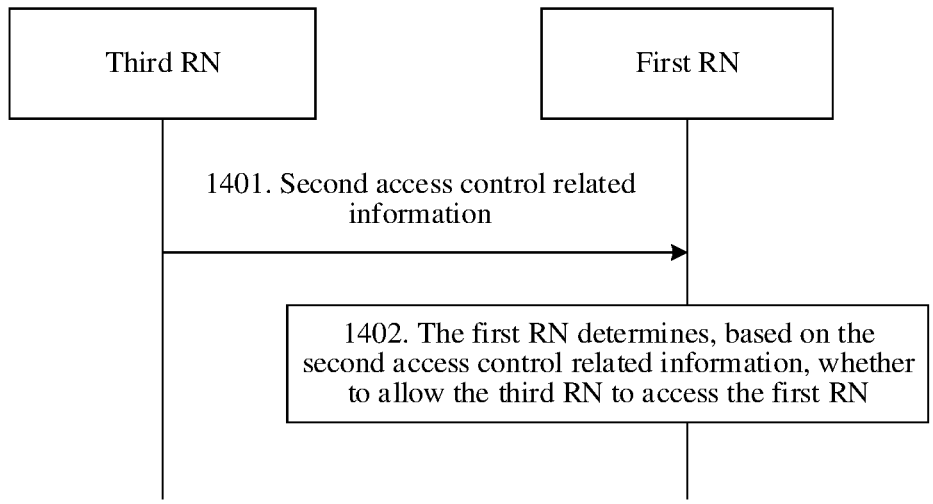
FIG. 14 is a flowchart of another access control method according to an embodiment of this application.

Referring to FIG. 14, the method may include the following steps.

1401. The first RN receives second access control related information from the third RN.

Optionally, the second access control related information includes at least one of the following information: a hop count of the third RN, load of the third RN, and a type of the third RN.

1402. The first RN determines, based on the second access control related information, whether to allow the third RN to access the first RN.

Specifically, a method for determining, by the first RN, whether to allow the third RN to access the first RN is similar to the method for determining, by the donor eNodeB, whether to allow the first RN to access the donor eNodeB in step 1102. Details are not described herein again.

Optionally, access control information of the first RN includes at least one of the following information: an RN-specific cell bar parameter, a hop count of an RN allowed to access the first RN, a total quantity of RNs allowed to access the first RN, load that the first RN can bear, a type of the RN allowed to access the first RN, and an indication indicating whether access is allowed.

Optionally, during specific implementation, step 1402 may include: receiving, by the first RN, access control information sent by a first communications site; and determining, by the first RN, based on the access control information sent by the first communications site and the second access control related information, whether to allow the third RN to access the first RN, where the first communications site is a communications site accessed by the first RN, and a site type of the first communications site is an RN or a donor eNodeB.

A method for generating, by the first RN, the access control information of the first RN based on the access control information sent by the first communications site is similar to the method for generating, by the first communications site, the first access control information of the first communications site based on the second access control information in Embodiment 1. Details are not described herein again.

Optionally, a site type of a first communications site may be an RN or a donor eNodeB.

If the first communications site is a donor eNodeB, the donor eNodeB sends access control information of the donor eNodeB to the first RN, where the access control information is used by the first RN to generate access control information of the first RN.

Optionally, the access control information of the donor eNodeB includes at least one of the following information: an RN-specific cell bar parameter, a hop count of an RN allowed to access the donor eNodeB, a total quantity of RNs allowed to access the donor eNodeB, load that the donor eNodeB can bear, a type of the RN allowed to access the donor eNodeB, and an indication indicating whether access is allowed.

Embodiment 4

In this embodiment, a first communications site or a donor eNodeB connected to a first communications site determines whether to allow the third RN to access the first RN.

Figure 15:
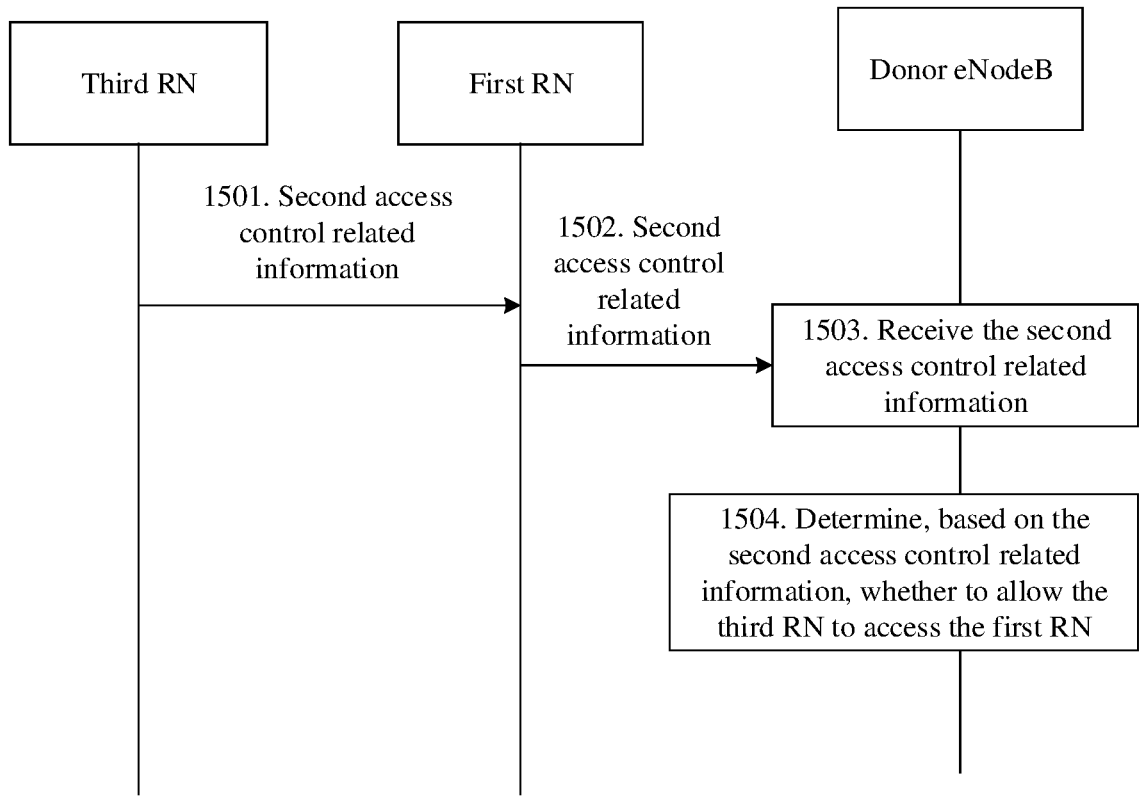
FIG. 15 is a flowchart of another access control method according to an embodiment of this application.

As shown in FIG. 15, the method may include the following steps.

1501. The first RN receives second access control related information from the third RN.

Optionally, the second access control related information includes at least one of the following information: a hop count of the third RN, load of the third RN, and a type of the third RN.

Specifically, the third RN may send the second access control related information of the third RN to the first RN in a random access and RRC connection setup process.

1502. The first RN sends the second access control related information to the first communications site.

When the first communications site is a donor eNodeB, or a donor eNodeB directly or indirectly connected to the first communications site determines whether to allow the third RN to access the first RN, step 1503 is performed.

1503. A donor eNodeB receives, by using the first RN, the second access control related information sent by the third RN.

1504. The donor eNodeB determines, based on the second access control related information, whether to allow the third RN to access the first RN.

Optionally, during specific implementation, step 1504 may include: determining, by the donor eNodeB based on the second access control related information and access control information of the donor eNodeB, whether to allow the third RN to access the first RN.

When the donor eNodeB is the first communications site, the donor eNodeB may directly receive, by using the first RN, the second access control related information sent by the third RN. When the donor eNodeB is the donor eNodeB directly or indirectly connected to the first communications site, the donor eNodeB may receive, by using the first communications site, the second access control related information sent by the third RN, the first communications site receives, by using the first RN, the second access control related information sent by the third RN, and the donor eNodeB determines, based on the second access control related information, whether to allow the third RN to access the first RN. A method for determining, by the donor eNodeB based on the second access control related information and the access control information of the donor eNodeB, whether to allow the third RN to access the first RN is similar to the method for determining, by the donor eNodeB, whether to allow the first RN to access the first communications site in step 1102. Details are not described herein again.

For example, the third RN may determine the hop count of the third RN based on broadcast message of the first RN or in another manner, thereby carrying the hop count information of the third RN when accessing the first RN.

When the first communications site is an RN, and the first communications site determines whether to allow the third RN to access the first RN, the first communications site may determine, based on access control information of the first communications site and the second access control related information, whether to allow the third RN to access the first RN. A method for determining, by the first communications site, whether to allow the third RN to access the first RN is similar to the method for determining, by the donor eNodeB, whether to allow the first RN to access the cell provided by the first communications site in step 1102. Details are not described herein again.

The access control information of the first communications site may be obtained by processing received access control information of the donor eNodeB directly or indirectly connected to the first communications site. A specific processing method is similar to the method for generating, by the first communications site, the first access control information of the first communications site based on the second access control information in Embodiment 1. Details are not described herein again.

Optionally, the access control information of the donor eNodeB includes at least one of the following information: an RN-specific cell bar parameter, a hop count of an RN allowed to access the donor eNodeB, a total quantity of RNs allowed to access the donor eNodeB, load that the donor eNodeB can bear, a type of the RN allowed to access the donor eNodeB, and an indication indicating whether access is allowed.

In the foregoing method, if an RN or a donor eNodeB allows access of another RN, the RN or the donor eNodeB delivers an accept message to the another RN; or if an RN or a donor eNodeB does not allow access of another RN, the RN or the donor eNodeB delivers an access reject message to the another RN. In addition, when receiving access control information sent by another communications site, a communications site may also not generate access control information of the communications site, and directly determine, based on the received access control information, whether to allow access of another RN. A determining principle is the same as the principle of determining whether to allow an RN to access a network above. Details are not described herein.

In addition, to implement the methods provided in the foregoing embodiments of this application, an existing protocol stack further needs to be improved. Specifically, in a control plane, a protocol stack of a control plane to which a first RN (an RN 2 in FIG. 16A and FIG. 16B) belongs includes an NG application protocol (NGAP) (or Xn application protocol (XnAP)) layer, configured to generate an NGAP (or XnAP) message for UE and receive and process an NGAP (or XnAP) message of a second RN (an RN 1 in FIG. 16A and FIG. 16B). The first RN is connected to a donor eNodeB by using the second RN. A protocol stack of a control plane of the second RN includes an NGAP (or XnAP) layer equivalent to the NGAP (or XnAP) layer in the protocol stack of the control plane of the first RN and an NGAP (or XnAP) layer equivalent to the donor eNodeB, used as NGAP (or XnAP) proxies of the first RN, to be specific, configured to process an NGAP (or XnAP) message sent by the first RN and send the processed message to the donor eNodeB, and receive and process an NGAP (or XnAP) message sent by the donor eNodeB and send the processed message to the first RN.

In a user plane, a protocol stack of a user plane to which the first RN belongs includes a GTP-U layer equivalent to the GTP-U layer of the second RN, where the GTP-U layer is configured to generate a GTP-U data packet for the UE, and receive and process a GTP-U data packet sent by the second RN. A protocol stack of a user plane to which the second RN belongs includes a GTP-U layer equivalent to the GTP-U layer of the first RN and a GTP-U layer equivalent to the GTP-U layer of the donor eNodeB that are used as GTP-U proxies of the first RN to receive and process a GTP-U data packet sent by the first RN and send the GTP-U data packet to the donor eNodeB, and receive and process a GTP-U data packet sent by the donor eNodeB and send the GTP-U data packet to the first RN.

Figure 16A:
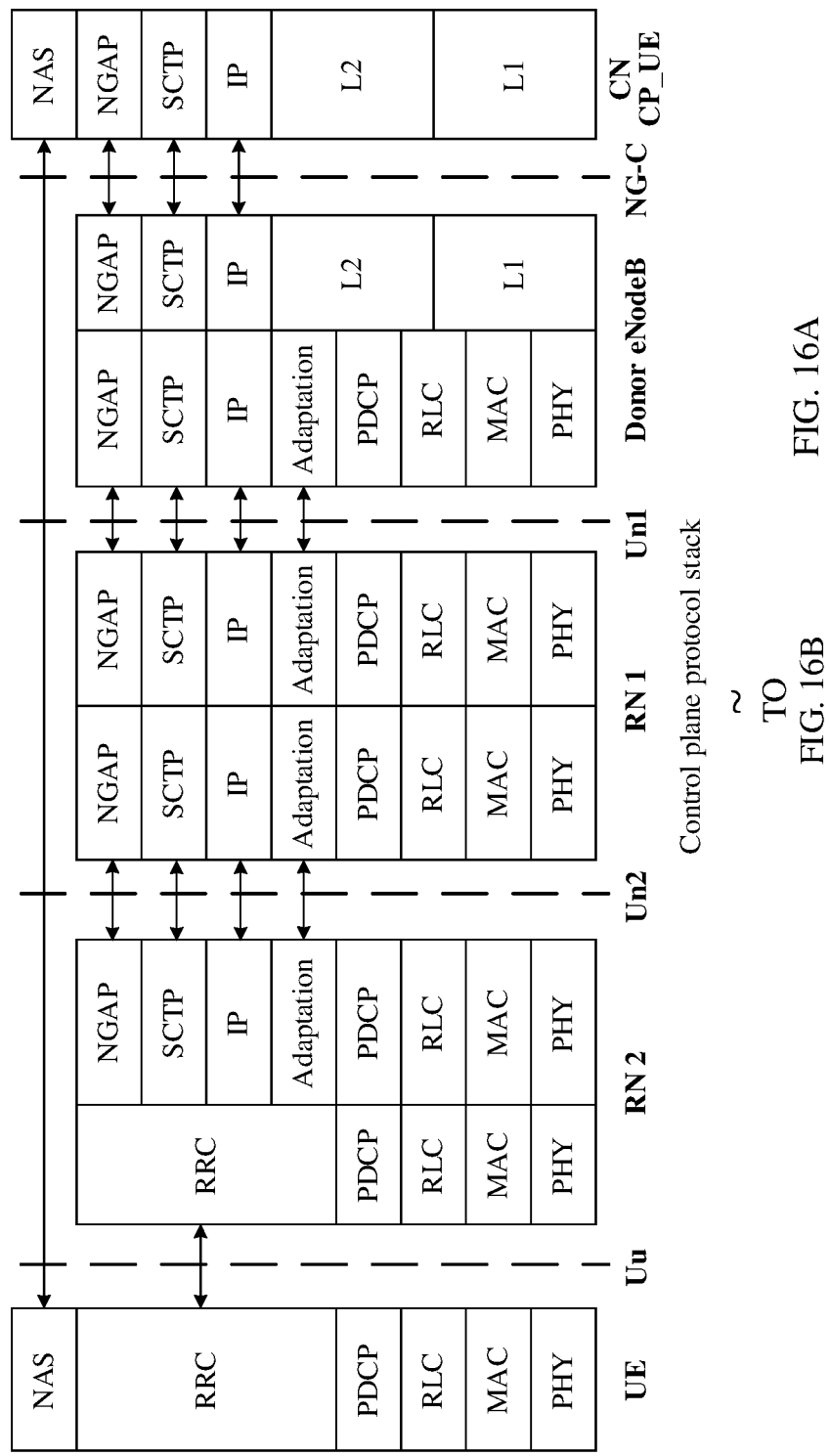

Specifically, for the protocol stacks of the control plane and the user plane to which the first RN belongs, refer to FIG. 16A and FIG. 16B. The control plane includes the UE, the RN 2, the RN 1, the donor eNodeB, and a CN CP_UE (a control plane function of a CN serving the UE). The user plane includes the UE, the RN 2, the RN 1, the donor eNodeB, and a CN UP_UE (a user plane function of a CN serving the UE). An air interface between the UE and the RN 2 is denoted as Uu. An air interface between the RN 2 and the RN 1 is denoted as Un2. An air interface between the RN 1 and the donor eNodeB is denoted as Un1. An interface between the donor eNodeB and the CN CP_UE is denoted as an NG-C interface. An interface between the donor eNodeB and the CN UP_UE is denoted as an NG-U interface.

In the control plane, to avoid a difference in behavior of the UE due to a change of a network deployment form (for example, a multi-hop RN in a network), the UE uses a same protocol stack as UE of an existing LTE system and a 5G system. To be specific, the protocol stack of the UE includes a NAS, an RRC layer, a PDCP layer, an RLC layer, a MAC layer, and a PHY from top to bottom.

Similarly, on the Uu interface, a protocol stack for the RN 2 to communicate with the UE is the same as a protocol stack of a donor eNodeB in the existing LTE system and the 5G system. To be specific, the protocol stack for the RN 2 to communicate with the UE includes an RRC layer, a PDCP layer, an RLC layer, a MAC layer, and PHY layer from top to bottom. On the Un2 interface, a protocol stack of the RN 2 includes an NGAP layer, an SCTP layer, an IP layer, an adaptation (Adaptation) layer, a PDCP layer, an RLC layer, a MAC layer, and a PHY layer from top to bottom. The NGAP layer is configured to send and receive, on the Un2 interface, an NGAP message of UE accessing the RN 2. The NGAP message carries a UE identifier, where the UE identifier is used to identify a message of the UE on the Un2 interface. The SCTP layer and the IP layer are configured to carry and transmit the NGAP message. The adaptation layer may be configured to identify an NGAP (or XnAP) message type. To be specific, if a same DRB of the Un2 interface carries data of the RN 2 in the mean time, the NGAP (or XnAP) message of the UE accessing the RN 2, and a GTP-U data packet of the UE accessing the RN 2, the adaptation layer may add corresponding identifiers (for example, an identifier of the RN 2, the UE identifier, and a message type), used to distinguish between the data of the RN 2 and the NGAP (or XnAP) message or the GTP-U packet of the UE accessing the RN 2. Optionally, the RN 2 allocates a UE NGAP ID on an RN 2 side on the Un2 interface.

On the Un2 interface, a protocol stack architecture of the RN 1 is equivalent to that of the RN 2, and includes an NGAP layer, an SCTP layer, an IP layer, an adaptation layer, a PDCP layer, an RLC layer, a MAC layer, and a PHY layer from top to bottom. The NGAP layer is configured to send and receive, on the Un2 interface, an NGAP message of UE accessing the RN 1. The NGAP message carries a UE identifier, where the UE identifier is used to identify a message of the UE on the Un2 interface. The SCTP layer and the IP layer are configured to carry and transmit the NGAP message. The adaptation layer may be configured to identify an NGAP (or XnAP) message. To be specific, if a same DRB of the Un2 interface carries data of the RN 2, the NGAP (or XnAP) message of the UE accessing the RN 2, and a GTP-U data packet of the UE accessing the RN 2, the adaptation layer may add corresponding identifiers (for example, an identifier of the RN 2, the UE identifier, and a message type), used to distinguish between the data of the RN 2 and the NGAP (or XnAP) message or the GTP-U packet of the UE accessing the RN 2. On the Un1 interface, a protocol stack for the RN 1 to communicate with the donor eNodeB includes an NGAP layer, an SCTP layer, an IP layer, an adaptation layer, a PDCP layer, an RLC layer, a MAC layer, and a PHY layer from top to bottom. The NGAP layer is configured to send and receive an NGAP message of the UE on the Un1 interface. The NGAP message carries a UE identifier, where the UE identifier is used to identify a message of the UE on the Un1 interface. The SCTP layer and the IP layer are configured to carry and transmit the NGAP message. The adaptation layer may be configured to identify an NGAP (or XnAP) message. To be specific, if a same DRB of the Un1 interface carries at least one or a combination of the following data types: data of the RN 1, an NGAP (or XnAP) message of the UE accessing the RN 1, a GTP-U data packet of the UE accessing the RN 1, data of the RN 2, an NGAP (or XnAP) message of the UE accessing the RN 2, and a GTP-U data packet of the UE accessing the RN 2. The adaptation layer may add corresponding identifiers (for example, an identifier of the RN 1, an identifier of the RN 2, the UE identifier, and a message type), used to distinguish between the data of the RN 1, the data of the RN 2, and the NGAP (or XnAP) message or the GTP-U packet of the UE accessing the RN 1 or the RN 2. Optionally, the RN 1 allocates an NGAP UE ID on an RN 1 side on the Un2 interface. Optionally, the RN 1 allocates a UE NGAP ID on the RN 1 side on the Un1 interface. Further, optionally, the RN 1 determines and/or maintains a mapping relationship between the UE NGAP ID on the Un2 interface and the UE NGAP ID on the Un1 interface. For example, the mapping relationship is used to associate a UE NGAP ID 1 on the Un2 interface and a UE NGAP ID 2 on the Un1 interface with same UE. The foregoing UE ID may be on the RN 1 side (to be specific, configured by the RN 1). Optionally, the mapping relationship may be determined by the RN 1 by itself, or configured by a site accessed by the RN 1, or configured by the donor eNodeB.

On the Un1 interface, a protocol stack architecture of the donor eNodeB is equivalent to that of the RN 1, and includes an NGAP layer, an SCTP layer, an IP layer, an adaptation layer, a PDCP layer, an RLC layer, a MAC layer, and a PHY layer from top to bottom. The NGAP layer is configured to send and receive an NGAP message of UE on the Un1 interface. The NGAP message carries a UE identifier, where the UE identifier is used to identify a message of the UE on the Un1 interface. The SCTP layer and the IP layer are configured to carry and transmit the NGAP message. The adaptation layer may be configured to identify an NGAP (or XnAP) message. To be specific, if a same DRB of the Un1 interface carries at least one or a combination of the following data types: data of the RN 1, an NGAP (or XnAP) message of the UE accessing the RN 1, a GTP-U data packet of the UE accessing the RN 1, data of the RN 2, an NGAP (or XnAP) message of the UE accessing the RN 2, and a GTP-U data packet of the UE accessing the RN 2. The adaptation layer may add corresponding identifiers (for example, an identifier of the RN 1, an identifier of the RN 2, the UE identifier, and a message type), used to distinguish between the data of the RN 1, the data of the RN 2, and the NGAP (or XnAP) message or the GTP-U packet of the UE accessing the RN 1 or the RN 2. On the NG-C interface, the donor eNodeB and a common base station have same protocol stacks and same functions. For example, an NGAP layer is configured to send and receive an NGAP message of UE on the NG-C interface. The NGAP message carries a UE identifier, where the UE identifier is used to identify the UE on the NG-C interface. The donor eNodeB allocates an NGAP UE ID on a donor eNodeB side on the NG-C interface. Optionally, the donor eNodeB allocates a UE NGAP ID on a base station side on the Un1 interface. The donor eNodeB allocates and/or maintains a mapping relationship between a UE NGAP ID on the Un1 interface and a UE NGAP ID on the NG-C interface. For example, the mapping relationship is used to associate a UE NGAP ID 1 on the Un1 interface and a UE NGAP ID 2 on the NG-C interface with same UE. The foregoing UE ID may be on the donor eNodeB side. Optionally, the mapping relationship may be determined by the donor eNodeB by itself.

In the user plane, to avoid the difference in the behavior of the UE due to the change of the network deployment form (for example, the multi-hop RN in the network), the UE uses a same protocol stack as the UE of the existing LTE system and the 5G system. To be specific, the protocol stack of the UE includes an IP layer, an SDAP layer, a PDCP layer, an RLC layer, a MAC layer, and a PHY from top to bottom.

Similarly, on the Uu interface, a protocol stack for the RN 2 to communicate with the UE is the same as a protocol stack of a base station in the existing 5G system. To be specific, the protocol stack for the RN 2 to communicate with the UE includes an SDAP layer, a PDCP layer, an RLC layer, a MAC layer, and PHY layer from top to bottom. On the Un2 interface, a protocol stack of the RN 2 includes a GTP-U layer, a UDP layer, an IP layer, an SDAP layer, an adaptation layer, a PDCP layer, an RLC layer, a MAC layer, and a PHY layer from top to bottom. The GTP-U layer is configured to set up a data transmission channel for the UE on the Un2 interface, and a GTP-U data packet carries a tunnel identifier, corresponding to a session connection of the UE. The UDP layer and the IP layer are configured to carry and transmit the GTP-U data packet. The SDAP layer is configured to identify a session connection, a data flow, a QoS parameter, and the like, and may also be configured to be in a transparent transmission mode. The adaptation layer may be configured to identify the GTP-U data packet. To be specific, if a same DRB of the Un2 interface carries at least one or a combination of the following data types: data of the RN 2, an NGAP (or XnAP) message of the UE accessing the RN 2, and a GTP-U packet of the UE accessing the RN 2. The adaptation layer may add corresponding identifiers (for example, an identifier of the RN 2, a UE identifier, and a message type), used to distinguish between the data of the RN 2 and the NGAP (or XnAP) message or the GTP-U packet of the UE accessing the RN 2.

On the Un2 interface, a protocol stack architecture of the RN 1 is equivalent to that of the RN 2, and includes a GTP-U layer, a UDP layer, an IP layer, an SDAP layer, an adaptation layer, a PDCP layer, an RLC layer, a MAC layer, and a PHY layer from top to bottom. The GTP-U layer is configured to set up a data transmission channel for the UE on the Un2 interface, and a GTP-U data packet carries a tunnel identifier, corresponding to a session connection of the UE. The UDP layer and the IP layer are configured to carry and transmit the GTP-U data packet. The SDAP layer is configured to identify a session connection, a data flow, a QoS parameter, and the like, and may also be configured to be in a transparent transmission mode. The adaptation layer may be configured to identify the GTP-U data packet. To be specific, if a same DRB of the Un2 interface carries at least one or a combination of the following data types: data of the RN 2, an NGAP (or XnAP) message of the UE accessing the RN 2, and a GTP-U packet of the UE accessing the RN 2. The adaptation layer may add corresponding identifiers (for example, an identifier of the RN 2, a UE identifier, and a message type), used to distinguish between the data of the RN 2 and the NGAP (or XnAP) message or the GTP-U packet of the UE accessing the RN 2. On the Un1 interface, a protocol stack for the RN 1 to communicate with the donor eNodeB includes a GTP-U layer, a UDP layer, an IP layer, an SDAP layer, an adaptation layer, a PDCP layer, an RLC layer, a MAC layer, and a PHY layer from top to bottom. The GTP-U layer is configured to set up a data transmission channel for the UE on the Un1 interface, and a GTP-U data packet carries a tunnel identifier, corresponding to a session connection of the UE. The UDP layer and the IP layer are configured to carry and transmit the GTP-U data packet. The SDAP layer is configured to identify a session connection, a data flow, a QoS parameter, and the like, and may also be configured to be in a transparent transmission mode. The adaptation layer may be configured to identify the GTP-U data packet of the UE. To be specific, if a same DRB of the Un1 interface carries at least one or a combination of the following data types: data of the RN 1, an NGAP (or XnAP) message of the UE accessing the RN 1, a GTP-U data packet of the UE accessing the RN 1, data of the RN 2, an NGAP (or XnAP) message of the UE accessing the RN 2, and a GTP-U data packet of the UE accessing the RN 2. The adaptation layer may add corresponding identifiers (for example, an identifier of the RN 1, an identifier of the RN 2, a UE identifier, and a message type), used to distinguish between the data of the RN 1, the data of the RN 2, and the NGAP (or XnAP) message or the GTP-U packet of the UE accessing the RN 1 or the RN 2.

On the Un1 interface, a protocol stack architecture of the donor eNodeB is equivalent to that of the RN 2, and includes a GTP-U layer, a UDP layer, an IP layer, an SDAP layer, an adaptation layer, a PDCP layer, an RLC layer, a MAC layer, and a PHY layer from top to bottom. The GTP-U layer is configured to set up a data transmission channel for the UE on the Un1 interface, and a GTP-U data packet carries a tunnel identifier, corresponding to a session connection of the UE. The UDP layer and the IP layer are configured to carry and transmit the GTP-U data packet. The SDAP layer is configured to identify a session connection, a data flow, a QoS parameter, and the like, and may also be configured to be in a transparent transmission mode. The adaptation layer may be configured to identify the GTP-U data packet of the UE. To be specific, if a same DRB of the Un1 interface carries at least one or a combination of the following data types: data of the RN 1, an NGAP (or XnAP) message of the UE accessing the RN 1, a GTP-U data packet of the UE accessing the RN 1, data of the RN 2, an NGAP (or XnAP) message of the UE accessing the RN 2, and a GTP-U data packet of the UE accessing the RN 2. The adaptation layer may add corresponding identifiers (for example, an identifier of the RN 1, an identifier of the RN 2, a UE identifier, and a message type), used to distinguish between the data of the RN 1, the data of the RN 2, and the NGAP (or XnAP) message or the GTP-U packet of the UE accessing the RN 1 or the RN 2. On the NG-U interface, the donor eNodeB and the common base station have same protocol stacks and same functions. Details are not described herein again.

It should be noted that different from a single-hop RN network architecture, in a multi-hop RN network architecture, an intermediate RN node needs to forward signaling and data for UE served by a next hop of RN. For example, in FIG. 16A and FIG. 16B, the intermediate RN node may be the RN 1. In a process of forwarding the signaling and/or data, the intermediate RN node needs to convert a UE identifier, for example, the RN 1 maps UE identifiers on the Un2 and Un1 interfaces.

In addition, when the intermediate RN node forwards signaling and/or data sent by the next hop of RN to the donor eNodeB, an identifier of the next hop RN needs to be added for the donor eNodeB to identify the RN. Correspondingly, when the donor eNodeB sends signaling and/or data of the next hop of RN to the intermediate RN node, an identifier of the next hop of RN is added to indicate to the intermediate RN node that the signaling and/or the data needs to be sent to the next hop of RN.

Alternatively, when the intermediate RN node forwards signaling and/or data sent by the UE served by the next hop of RN to the donor eNodeB, an identifier of the next hop of RN and the UE identifier need to be added for the donor eNodeB to identify the RN and the UE served by the RN. Correspondingly, when the donor eNodeB sends signaling and/or data that is of the UE served by the next hop of RN to the intermediate RN node, an identifier of the next hop of RN and a UE identifier are added to indicate to the intermediate RN node that the signaling and/or the data needs to be sent to the next hop of RN. In addition, when the intermediate RN node forwards the signaling and/or the data to the next hop of RN, an identifier of the UE served by the next hop of RN is added to instruct the next hop of RN to identify the UE served by the next hop of RN.

Figure 17:
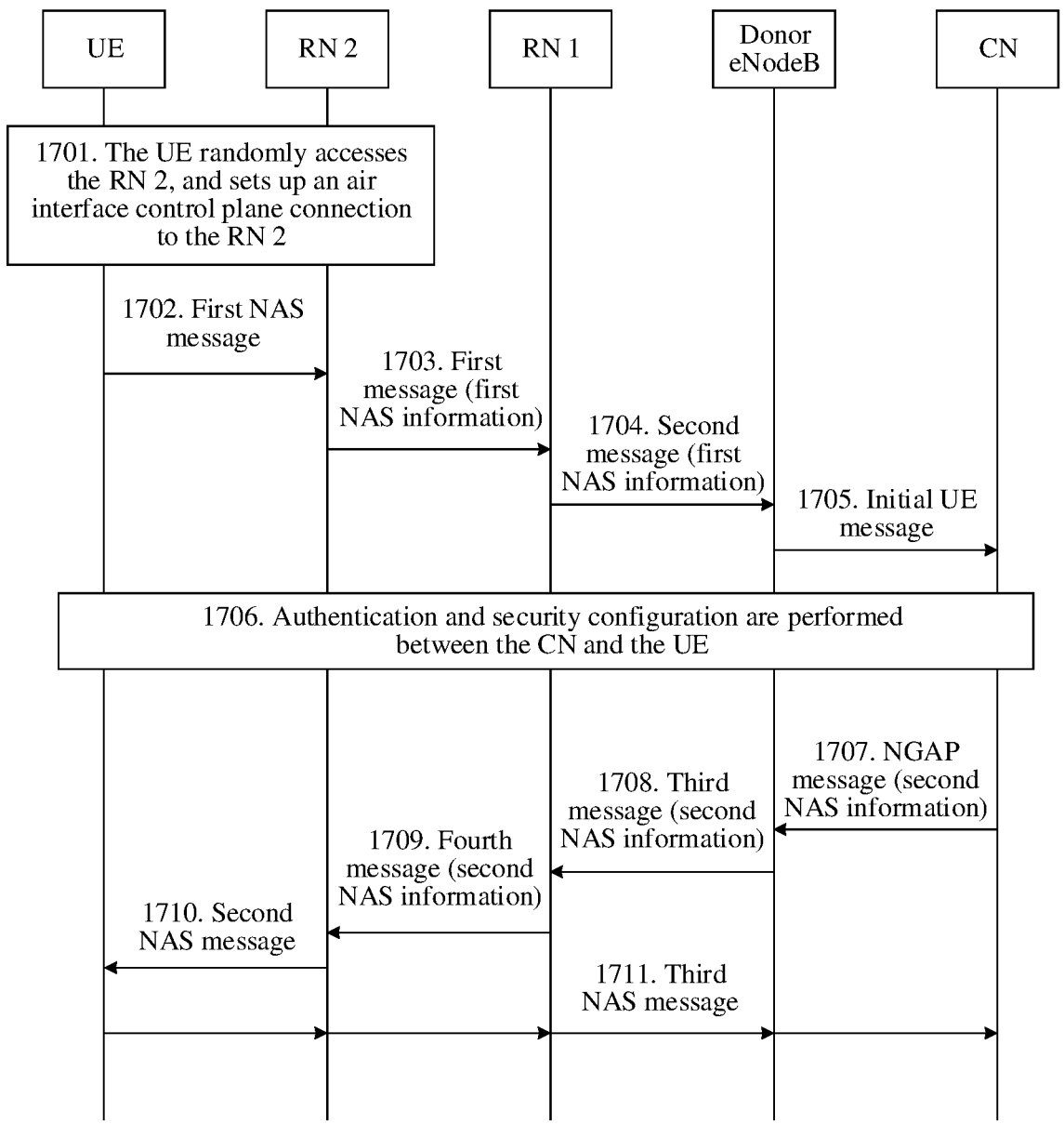
FIG. 17 is a flowchart of setting up a control plane connection of UE according to an embodiment of this application.

Based on the protocol stack architecture (not limited to the protocol stack architecture) shown in FIG. 16A and FIG. 16B, FIG. 17 shows a process of setting up a control plane connection of UE accessing a network. The process includes the following steps.

1701. The UE randomly accesses the RN 2, and sets up an air interface control plane connection (for example, an RRC connection) to the RN 2.

1702. The UE sends a first NAS message for requesting registration on a CN to the RN 2.

For example, the first NAS message may be an attach request (attach request) message.

Optionally, the first NAS message may be carried in an RRC message, for example, an RRC connection setup complete message.

1703. The RN 2 sends a first message to the RN 1, where the first message is used to indicate that new UE accesses the RN 2 and initiates registration on the CN, and the first message carries the first NAS message.

For example, the first message may be an NGAP message such as an initial UE message.

Optionally, the RN 2 adds, to the first message, a UE ID (for example, the UE ID may be an RN 2 UE NGAP ID-Un2) allocated by the RN 2 to the UE. The UE ID is used to identify the UE on the Un2 interface.

Optionally, the first message is processed by an adaptation layer, at least one of information such as a UE identifier and information type indication information is added to the first message, and then the first message is sent to a lower-layer protocol stack. The UE identifier is used to identify the UE. The information type indication information is used to indicate that the message is a control plane message of the UE, for example, an NGAP message.

Optionally, the first message is carried on a DRB on the Un2 interface of the RN 2. If there are a plurality of DRBs on the Un2 interface, a DRB ID of a specifically used DRB may be designated by the RN 1, the donor eNodeB, or an OAM entity, or determined by the RN 2 by itself.

1704. The RN 1 sends a second message to the donor eNodeB based on the first message, where the second message is used to indicate that the new UE accesses the RN 2 and initiates the registration on the CN, and the second message carries the first NAS message. For example, the second message may be an NGAP message such as an initial UE message.

Optionally, the RN 1 adds, to the second message, a UE ID (for example, the UE ID may be an RN 1 UE NGAP ID-Un1) allocated by the RN 1 to the UE. The UE ID is used to identify the UE on the Un1 interface.

Optionally, the RN 1 sets up a mapping relationship between the UE ID allocated by the RN 2 to the UE in the first message and the UE ID allocated by the RN 1 to the UE. To be specific, the RN 2 UE NGAP ID-Un2 and the RN 1 UE NGAP ID-Un1 correspond to same UE.

Optionally, the RN 1 receives the first message, and may learn, based on the information type indication information included in the first message and obtained by using the adaptation layer, that the message is an NGAP message, thereby performing corresponding processing. For example, the RN 1 sends the first message to an NGAP layer, and obtains necessary information (for example, the first NAS message) for generating the second message.

Optionally, the second message is processed by the adaptation layer, at least one of information such as an identifier of the RN 2, the UE identifier, and the information type indication information is added to the second message, and then the second message is sent to the lower-layer protocol stack. The identifier of the RN 2 is used to identify that the message is from the RN 2. The UE identifier is used to identify the UE. The information type indication information is used to indicate that the message is a control plane message of the UE, for example, an NGAP message.

Optionally, the second message is carried on a DRB on the Un1 interface of the RN 1. If there are a plurality of DRBs on the Un1 interface, a DRB ID of a specifically used DRB may be designated by the donor eNodeB or the OAM entity, or determined by the RN 1 by itself.

1705. The donor eNodeB generates an initial UE message of the UE based on the second message, and sends the initial UE message to a corresponding control plane entity (for example, a core access and mobility management function (AMF)) of a CN. The initial UE message is used to indicate that the message includes a first uplink (UL) NAS message of the UE. For example, the initial UE message is an NGAP message. The NGAP message includes a UE ID that is allocated by the donor eNodeB to the UE and that is used for the NG-C interface. For example, the UE ID may be an NB UE NGAP ID.

Optionally, the donor eNodeB sets up a mapping relationship between the UE ID allocated by the RN 1 to the UE in the second message and the UE ID for the NG-C interface that is allocated by the donor eNodeB to the UE. To be specific, the RN 1 UE NGAP ID-Un1 and the NB UE NGAP ID correspond to same UE.

Optionally, the donor eNodeB receives the second message, and learns, by using the information type indication information that is carried in the adaptation layer and that is in the second message, that the message is an NGAP message, and/or learns, by using the UE identifier that is carried in the adaptation layer and that is in the second message, that the message is a UE-related message, and/or learns, by using the identifier of the RN 2 that is carried in the adaptation layer and that is in the second message, that the message is an RN 2-related message.

1706. Authentication and security configuration are performed between the CN and the UE.

Step 1706 is an optional step.

1707. The CN instructs, by using an NGAP message, the donor eNodeB to set up a necessary context for the UE.

For example, the NGAP message may be an initial context configuration request message.

Optionally, the NGAP message includes a UE ID allocated by the CN control plane entity (for example, an AMF) to the UE. For example, the UE ID may be an AMF UE NGAP ID, and the UE ID is used to identify the UE on the NG-C interface.

It should be noted that if the CN passes the registration of the UE, the CN needs to reply, by using a second NAS message, to the UE that the registration succeeds. The second NAS message may be an attach accept (attach accept) message. The second NAS message may be carried in the NGAP message.

1708. The donor eNodeB receives an NGAP message from the CN, generates a third message based on the NGAP message, and sends the third message to the RN 1.

The third message carries the second NAS message. For example, the third message may be an NGAP message, for example, an initial context configuration request message.

Optionally, the third message carries a UE ID that is allocated by the donor eNodeB to the UE on the Un1 interface. For example, the UE ID may be represented by an NB UE NGAP ID-Un1.

Optionally, the donor eNodeB sets up an association relationship between at least two of the following UE identifiers: the UE identifier allocated by the CN control plane entity to the UE, the identifier allocated by the donor eNodeB to the UE on the NG-C interface, the identifier allocated by the donor eNodeB to the UE on the Un1 interface, and the identifier allocated by the RN 1 to the UE on the Un1 interface. To be specific, the AMF UE NGAP ID, the NB UE NGAP ID, the NB UE NGAP ID-Un1, and the RN 1 UE NGAP ID-Un1 correspond to same UE.

Optionally, the third message is processed by the adaptation layer, at least one of the following identifiers is added to the third message: an identifier of the RN 2, a UE identifier, and information type indication information, and then the third message is sent to a lower-layer protocol stack. The identifier of the RN 2 is used to identify that all or a part (including at least the second NAS message) of the message needs to be sent to the RN 2. The UE identifier is used to identify UE served by the RN 2. The information type indication information is used to indicate that the message is a control plane message of the UE, for example, an NGAP message.

Optionally, the third message is carried on a DRB of the RN 1 on the Un1 interface. For example, the third message and the second message use a same DRB. If there are a plurality of DRBs of the RN 1 on the Un1 interface, a DRB ID of a specifically used DRB may be designated by the donor eNodeB or the OAM entity, or determined by the RN 1 by itself.

1709. The RN 1 generates a fourth message based on the third message and sends the fourth message to the RN 2, where the fourth message carries the second NAS message.

For example, the fourth message may be an NGAP message, for example, an initial context setup request message.

Optionally, the fourth message carries a UE ID that is allocated by the RN 1 to the UE on the Un2 interface, for example, an RN 1 UE NGAP ID-Un2.

Optionally, the RN 1 sets up an association relationship between at least two of the following UE identifiers: the identifier allocated by the donor eNodeB to the UE on the Un1 interface, the identifier allocated by the RN 1 to the UE on the Un1 interface, the identifier allocated by the RN 1 to the UE on the Un2 interface, and the identifier allocated by the RN 2 to the UE on the Un2 interface. To be specific, the NB UE NGAP ID-Un1, the RN 1 UE NGAP ID-Un1, the RN 1 UE NGAP ID-Un2, and the RN 2 UE NGAP ID-Un2 correspond to same UE.

Optionally, the RN 1 receives the third message, and learns, by using the information type indication information that is carried in the adaptation layer and that is in the third message, that the message is an NGAP message, and/or learns, by using the UE identifier that is carried in the adaptation layer and that is in the third message, that the message is a UE-related message, and/or learns, by using the identifier of the RN 2 that is carried in the adaptation layer and that is in the third message, that the message is an RN 2-related message. For example, the RN 1 learns that the message is an NGAP message, thereby sending the message to an NGAP layer for processing, and obtaining necessary information (for example, the second NAS message) for generating the fourth message. The RN 1 obtains the identifier of the RN 2 in the message, thereby sending the fourth message to an RN corresponding to the identifier of the RN 2 on the Un2 interface. The RN 1 obtains the UE identifier in the message, thereby carrying the UE identifier in the fourth message.

Optionally, the fourth message is processed by the adaptation layer, at least one of the following identifiers is added to the fourth message: a UE identifier and message type, and then the fourth message is sent to a lower-layer protocol stack. The UE identifier is used to identify UE served by the RN 2. The information type indication information is used to indicate that the message is a control plane message of the UE, for example, an NGAP message.

Optionally, the fourth message is carried on a DRB of the RN 2 on the Un2 interface. For example, the fourth message and the first message use a same DRB. If there are a plurality of DRBs of the RN 2 on the Un2 interface, a DRB ID of a specifically used DRB may be designated by the RN 1, the donor eNodeB, or an OAM entity, or determined by the RN 2 by itself.

1710. The RN 2 receives the fourth message from the RN 1, and sends the second NAS message in the fourth message to the UE, where the second NAS message is used to indicate that the UE successfully registers on the CN. For example, the second NAS message may be carried in an RRC connection reconfiguration message for sending.

Optionally, the RN 2 sets up an association relationship between at least two of the following UE identifiers: the identifier allocated by RN 1 to the UE on the Un2 interface, the identifier allocated by the RN 2 to the UE on the Un2 interface, and an identifier allocated by the RN 2 to the UE on the Uu interface. The identifier may be represented by, for example, cell-radio network temporary identifier-Uu (cell-radio network temporary identifier-Uu, C-RNTI-Uu for short). For example, the RN 1 UE NGAP ID-Un2, the RN 2 UE NGAP ID-Un2, and the C-RNTI-Uu correspond to same UE.

Optionally, the RN 2 receives the fourth message, and learns, by using the information type indication information that is carried in the adaptation layer and that is in the fourth message, that the message is an NGAP message, and/or learns, by using the UE identifier that is carried in the adaptation layer and that is in the fourth message, that the message is a UE-related message. For example, the RN 2 transfers the message to an NGAP layer protocol stack for processing, and obtains the second NAS message in the message. Then, the second NAS message is processed by using a Uu interface protocol stack for the RN 2 to communicate with the UE, and is sent, by using a corresponding RRC message, to the UE corresponding to the UE identifier.

1711. The UE generates a third NAS message, where the third NAS message is used to be sent to the CN and indicate that registration is completed.

Specifically, the third NAS message is sent to the RN 2 by using the Uu interface. The RN 2 sends the third NAS message to the RN 1 by using the Un2 interface. The RN 1 sends the third NAS message to the donor eNodeB by using the Un1 interface. The donor eNodeB sends the third NAS message to the CN by using the NG-C interface.

Based on the user plane protocol stack shown in FIG. 16A and FIG. 16B, on the NG-U interface, user plane data of the UE accessing the RN 2 is transmitted at a granularity of a session. For example, on the NG-U interface, a dedicated GTP-U transmission tunnel is set up for the session, and a corresponding tunnel endpoint identifier (TEID) is identified. An identifier of a QoS flow included in the session is carried in a form of a QoS flow identifier (QFI) in a GTP-U header. The CN/donor eNodeB may identify data of the session of the UE by using the TEID. On the Un1 interface, the user plane data of the UE is carried on a DRB of the RN 1. A mapping relationship between the data (which may be at a granularity of a session or at a granularity of a QFI) in the session and the DRB of the RN 1 on the Un1 interface may be determined by the donor eNodeB by itself or configured by an OAM entity. On the Un2 interface, the user plane data of the UE is carried on a DRB of the RN 2. A mapping relationship between the data (which may be at a granularity of a session, or at a granularity of a QFI, or at a granularity of a DRB of the RN 1 on the Un1 interface) in the session and the DRB of the RN 2 on the Un2 interface may be determined by the RN 2 by itself, or is determined by the RN 1, or is configured by the donor eNodeB, or is configured by an OAM entity, and so on. On the Uu interface, the user plane data of the UE is carried on the Uu interface and transmitted at a granularity of a DRB. The RN 2 needs to configure, for the user plane data, a PDCP entity, an RLC entity, a logical channel, and the like that are configured to transmit the DRB. Specifically, for downlink, the RN 1 needs to complete mapping from Un1 interface data to Un2 interface data, and the RN 2 needs to complete mapping from the Un2 interface data to Uu interface data. For uplink, the RN 2 needs to complete mapping from the Uu interface data to the Un2 interface data, and the RN 1 needs to complete mapping from the Un2 interface data to the Un1 interface data.

Figure 18A:
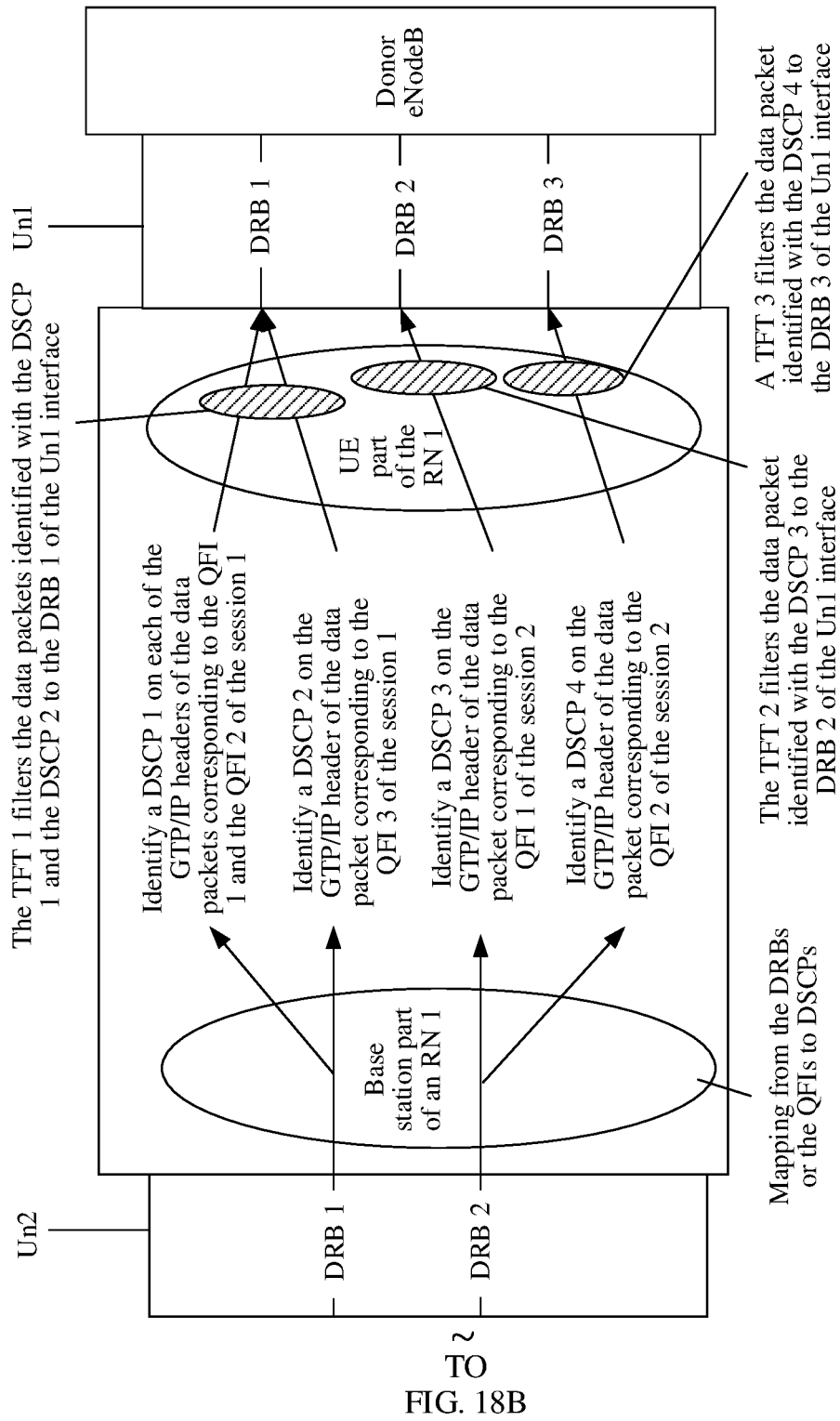
FIG. 18A and FIG. 18B are a schematic diagram of mapping between interfaces according to an embodiment of this application.
Figure 18B:
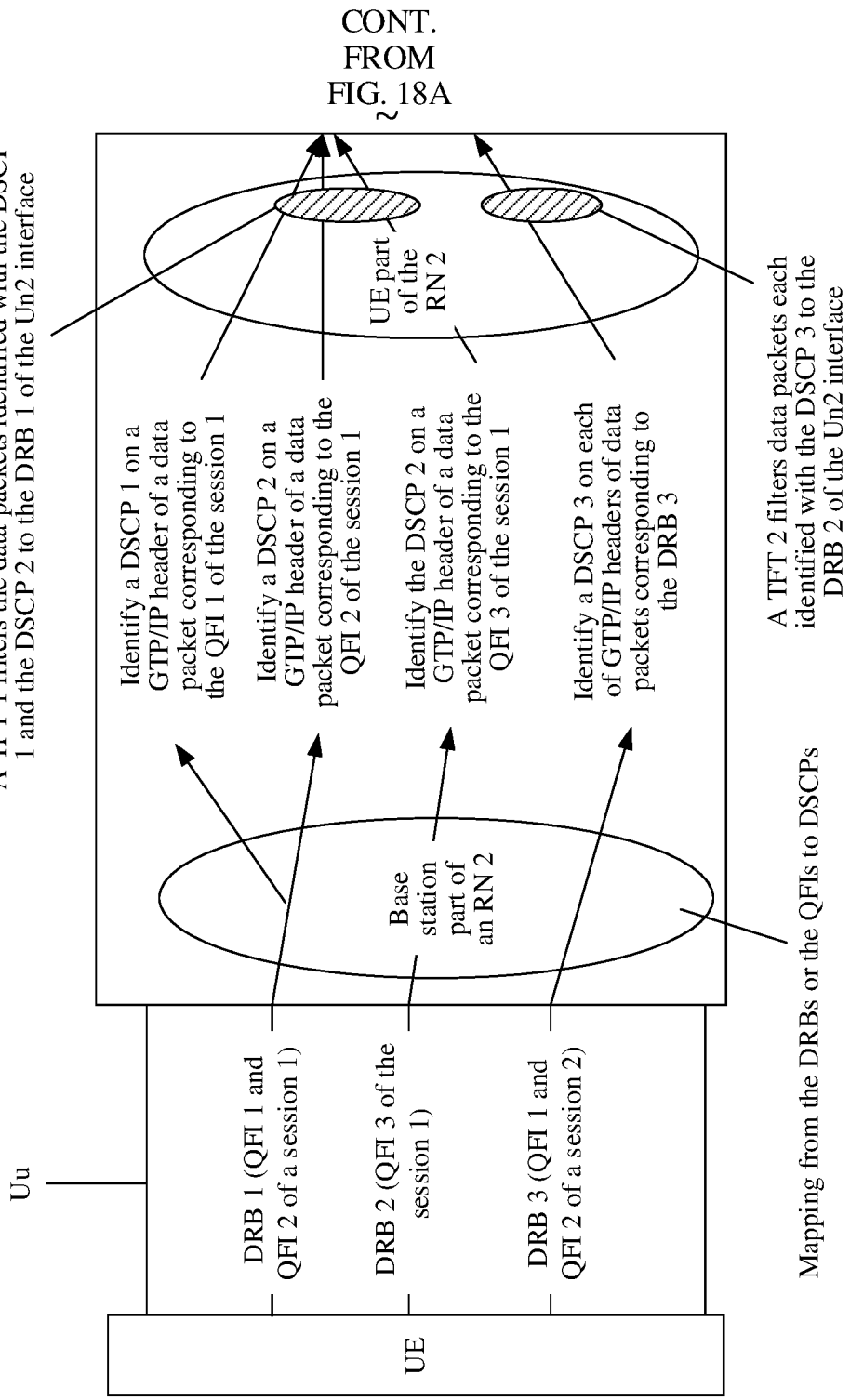

For example, FIG. 18A and FIG. 18B show that RNs are configured with relationships of mapping from session IDs and QFIs to differentiated services code points (DSCP) (or from a DRB to a DSCP) and data packet filters corresponding to the DSCPs, so that each RN can convert data packet bearers of two air interfaces connected to the RN.

For uplink, refer to FIG. 18A and FIG. 18B.

UE sets up three DRBs on the Uu interface. A DRB 1 is configured to transmit a QFI 1 and a QFI 2 of a session 1. A DRB 2 is configured to transmit a QFI 3 of the session 1. The DRB 3 is configured to transmit a QFI 1 and a QFI 2 of a session 2.

The RN 2 is configured with a relationship of mapping from session IDs and QFIs to DSCPs. For example, the QFI 1 of the session 1 corresponds to a DSCP 1, and the QFI 2 and the QFI 3 of the session 1 corresponds to DSCPs 2. For data packets received at the Uu interface, a base station part of the RN 2 learns of session IDs and QFIs by reading the session IDs and the QFIs (for example, SDAP headers), thereby identifying corresponding DSCP identifiers on IP headers of the data packets, and transmitting the data packets to a UE part of the RN 2. Alternatively, the RN 2 is configured with a relationship of mapping from the DRBs of the Uu interface to DSCPs. For example, the DRB 3 of the Uu interface corresponds to a DSCP 3. A base station part of the RN 2 identifies, for data packets received from the Uu interface based on identifiers of the DRBs to which the data packets belong, corresponding DSCP identifiers on GTP/IP headers of the data packets, and then sends the data packets to a UE part of the RN 2.

The RN 2 is configured with one or more groups of data packet filters (for example, traffic flow templates (TFT)) to map the data packets identified with the different DSCPs to corresponding DRBs of the Un2 interface. For example, a function of a TFT 1 is to map the DSCP 1 and the DSCPs 2 to a DRB 1, and a function of a TFT 2 is to map the DSCP 3 to a DRB 2.

Optionally, the relationship of mapping from the session IDs and the QFIs to the DSCPs (or the relationship of mapping from the DRBs of the Uu interface to the DSCPs) and/or the data packet filters may be determined by the RN 2 by itself based on QoS parameters of the data packets, or configured by the RN 1, or configured by the donor eNodeB, or configured by the OAM entity.

The RN 1 is configured with a relationship of mapping from the session IDs and the QFIs to DSCPs. For example, the QFI 1 and the QFI 2 of the session 1 correspond to the DSCP 1, the QFI 3 of the session 1 corresponds to the DSCP 2, the QFI 1 of the session 2 corresponds to the DSCP 3, and the QFI 2 of the session 2 corresponds to a DSCP 4. For the data packets received on the Un2 interface, a base station part of the RN 1 learns of the session IDs and the QFIs by reading the session IDs and the QFIs (for example, GTP-U headers), thereby identifying corresponding DSCP identifiers on the IP headers of the data packets, and then transmitting the data packets to a UE part of the RN 1. Alternatively, the RN 1 is configured with a relationship of mapping from the DRBs of the Un2 interface to DSCPs. A base station part of the RN 1 identifies, for the data packets received from the Un2 interface based on identifiers of the DRBs to which the data packets belong, corresponding DSCP identifiers on the IP headers of the data packets, and then sends the data packets to a UE part of the RN 1. Alternatively, the RN 1 is configured with a relationship of mapping from the DSCPs of the data packets of the Un2 interface to DSCPs of the data packets of the Un1 interface. A base station part of the RN 1 receives data on the Un2 interface, obtains the identifiers of the DSCPs of the Un2 interface by reading the IP headers of the data packets, identifies the corresponding DSCPs of the Un1 interface on the IP headers of the data packets based on the mapping relationship, and then transmits the data packets to a UE part of the RN 1.

The RN 1 is configured with one or more groups of data packet filters, to map the data packets identified with the different DSCPs to the corresponding DRBs of the Un1 interface.

Optionally, the relationship of mapping from the session IDs and the QFIs to the DSCPs (or the relationship of mapping from the DRBs of the Un2 interface to the DSCPs or the relationship of mapping from the DSCPs of the data packets of the Un2 interface to the DSCPs of the data packets of the Un1 interface) and/or the data packet filters may be determined by the RN 1 by itself based on the QoS parameters of the data packets, or configured by the donor eNodeB, or configured by the OAM entity.

Figure 19:
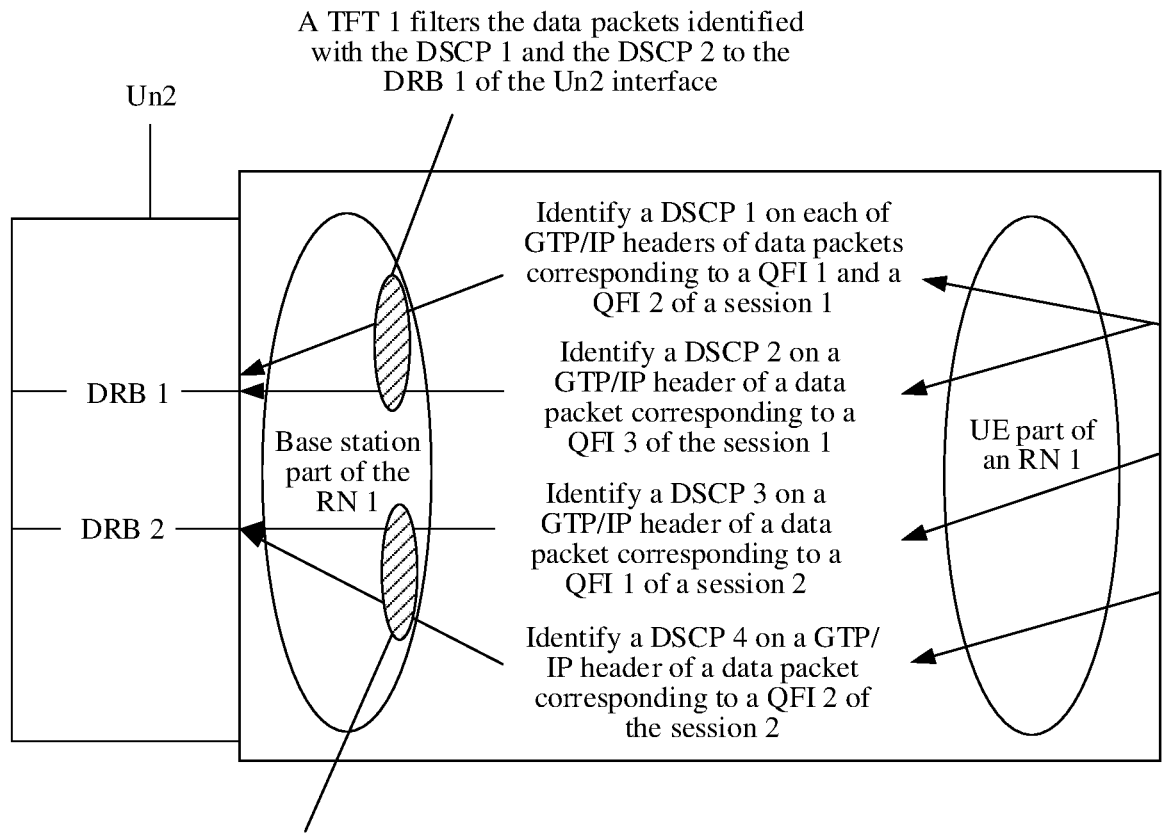
FIG. 19 is another schematic diagram of mapping between interfaces according to an embodiment of this application.

For downlink, on the Un1 interface, how to map user plane data sent to the UE to a DRB of the RN 1 may be implemented by the donor eNodeB through internal scheduling, or a mapping relationship is configured by the OAM entity. On the Un2 interface, how to map user plane data sent to the UE to a DRB of the RN 2 may be implemented by the base station part of the RN 1 through internal scheduling, or a mapping relationship is configured by the donor eNodeB, or a mapping relationship is configured by the OAM entity. On the Uu interface, how to map user plane data sent to the UE to a DRB of the UE may be implemented by the base station part of the RN 2 through internal scheduling, or a mapping relationship is configured by the RN 1, or the mapping relationship is configured by the donor eNodeB, or the mapping relationship is configured by the OAM entity. For the implementation by the donor eNodeB through internal scheduling, refer to the prior art. Details are not described herein again. A data sending process based on a mapping relationship is similar to that in uplink. Operations of the RN 1 are used as an example. As shown in FIG. 19, a specific process includes the following.

The RN 1 is configured with a relationship of mapping from session IDs and QFIs to DSCPs. For example, the QFI 1 and the QFI 2 of the session 1 correspond to a DSCP 1, the QFI 3 of the session 1 corresponds to a DSCP 2, the QFI 1 of the session 2 corresponds to a DSCP 3, and the QFI 2 of the session 2 corresponds to a DSCP 4. For data packets received on the Un1 interface, a UE part of the RN 1 learns of the session IDs and the QFIs by reading the session IDs and the QFIs (for example, GTP-U headers, SDAP headers, or adaptation layer headers), thereby identifying corresponding DSCP identifiers on IP headers of the data packets, and then transmitting the data packets to a base station part of the RN 1. Alternatively, the RN 1 is configured with a relationship of mapping from DRBs of the Un1 interface to DSCPs. A UE part of the RN 1 identifies, for data packets received from the Un1 interface based on identifiers of the DRBs to which the data packets belong, corresponding DSCP identifiers on IP headers of the data packets, and then sends the data packets to a base station part of the RN 1. Alternatively, the RN 1 is configured with a relationship of mapping from DSCPs of data packets of the Un1 interface to DSCPs of the data packets of the Un2 interface. A UE part of the RN 1 receives data on the Un1 interface, obtains identifiers of the DSCPs of the Un1 interface by reading IP headers of the data packets, identifies the corresponding DSCPs of the Un2 interface on the IP headers of the data packets based on the mapping relationship, and then transmits the data packets to a base station part of the RN 1.

The RN 1 is configured with one or more groups of data packet filters, to map the data packets identified with the different DSCPs to the corresponding DRBs of the Un2 interface.

Optionally, the relationship of mapping from the session IDs and the QFIs to the DSCPs (or the relationship of mapping from the DRBs of the Un1 interface to the DSCPs or the relationship of mapping from the DSCPs of the data packets of the Un1 interface to the DSCPs of the data packets of the Un2 interface) and/or the data packet filters may be determined by the RN 1 by itself based on the QoS parameters of the data packets, or configured by the donor eNodeB, or configured by the OAM entity.

Figure 20:
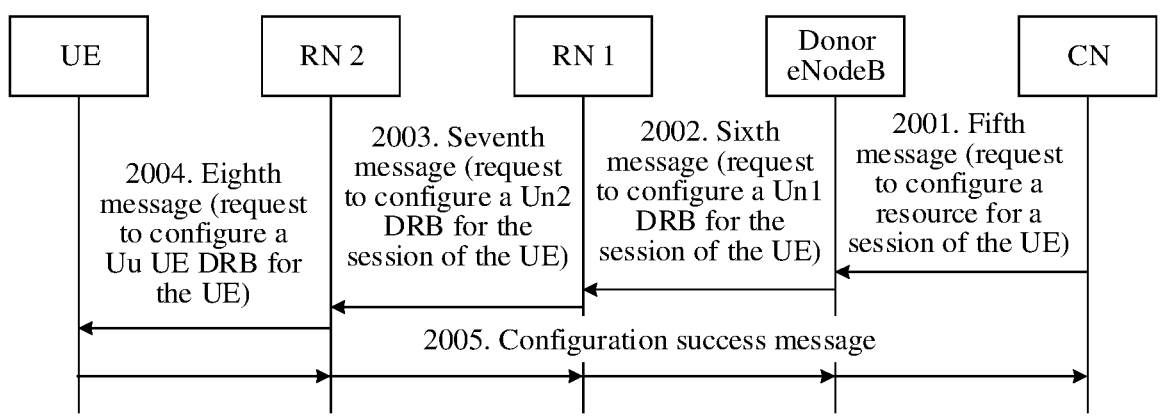
FIG. 20 is a flowchart of configuration of a user plane of UE according to an embodiment of this application.

To make user plane data transmission of the UE available, an NG-U data transmission tunnel, a Un1 RN 1 DRB, a Un2 RN 2 DRB, and a Uu UE DRB need to be configured for the UE. The donor eNodeB, the RN 1, and the RN 2 further need to obtain a mapping rule for data forwarding. Therefore, FIG. 20 shows a process of user plane configuration of the UE.

2001. The CN sends a fifth message to the donor eNodeB, where the fifth message is used to request to configure a resource for a session of the UE. For example, the fifth message may be an NGAP message, for example, a packet data unit session setup request or a packet data unit session modify request.

Optionally, the fifth message carries one or a combination of the following information: a TEID allocated by a CN user plane entity, a transport layer address (for example, an IP address or a port number) of the CN user plane entity, a session ID, a QFI, a QoS parameter, and a NAS message.

2002. The donor eNodeB generates a sixth message based on the fifth message and sends the sixth message to the RN 1, where the sixth message is used to request to configure a Un1 DRB for the session of the UE. The sixth message carries a UE identifier (for example, an identifier allocated by the RN 1 or allocated by the donor eNodeB, or a uniform identifier on the Un1 interface). For example, the sixth message may be an NGAP message.

Optionally, the sixth message carries one or a combination of the following information: a TEID allocated by the donor eNodeB to the session of the UE on the Un1 interface, a transport layer address (for example, an IP address or a port number) allocated by the donor eNodeB, a session ID, a QFI, a QoS parameter, Un1 RN 1 DRB configuration information, Un2 RN 2 DRB configuration information, a correspondence between the session and a Un1 RN 1 DRB, a correspondence between the QFI and the Un1 RN 1 DRB, a correspondence between the session and the Un2 RN 2 DRB, a correspondence between the QFI and the Un2 RN 2 DRB, a correspondence between the Un1 RN 1 DRB and the Un2 RN 2 DRB, and a NAS message.

2003. The RN 1 generates a seventh message based on the sixth message and sends the seventh message to the RN 2, where the seventh message is used to request to configure a Un2 DRB for the session of the UE. The seventh message carries a UE identifier (for example, an identifier allocated by the RN 1 or allocated by the RN 2, or a uniform identifier on the Un2 interface). For example, the seventh message may be an NGAP message.

Optionally, the seventh message carries one or a combination of the following information: a TEID allocated by the RN 1 to the session of the UE on the Un2 interface, a transport layer address (for example, an IP address or a port number) allocated by the RN 1, a session ID, a QFI, a QoS parameter, the Un2 RN 2 DRB configuration information, a correspondence between the session and the Un2 RN 2 DRB, a correspondence between the QFI and the Un2 RN 2 DRB, a correspondence between the Un1 RN 1 DRB and the Un2 RN 2 DRB, and a NAS message.

2004. The RN 2 generates an eighth message based on the seventh message, and sends the eighth message to the UE by using the Uu interface, where the eighth message is used to request to configure the Uu UE DRB for the UE. The eighth message carries a UE identifier (for example, a C-RNTI). For example, the eighth message may be an RRC message such as an RRC connection reconfiguration message.

Optionally, the eighth message carries one or a combination of the following information: a DRBID, a session ID, a QFI, a QoS parameter, DRB configuration information, and a NAS message.

2005. Optionally, the UE sends a configuration success message to the RN 2 by using the Uu interface. The RN 2 sends a configuration success message to the RN 1 by using the Un2 interface, where the message carries a UE identifier and a TEID and a transport network layer (TNL) address that are allocated by the RN 2 on the Un2 interface. The RN 1 sends a configuration success message to the donor eNodeB by using the Un1 interface, where the message carries a UE identifier and a TEID and a TNL address that are allocated by the RN 1 on the Un1 interface. The donor eNodeB sends a configuration success message to the CN by using the NG-C interface, where the message carries a UE identifier and a TEID and a TNL address that are allocated by the donor eNodeB on the NG-C interface.

It should be noted that the process of user plane configuration shown in FIG. 20 may be independently performed, or may be completed together with the access process shown in FIG. 17. For example, the information carried in the fifth message may be carried in the NGAP message in step 1707, the information carried in the sixth message may be carried in the third message shown in FIG. 17, the information carried in the seventh message may be carried in the fourth message shown in FIG. 17, and the information carried in the eighth message and the second NAS message shown in FIG. 17 may be included in a same message.

Specifically, the protocol stack shown in FIG. 16A and FIG. 16B is used as an example. A DRB of the RN 2 on a Un2 interface may carry the data of the RN 2, the NGAP message of the UE accessing the RN 2, and the user plane data (for example, a TEID for identifying a GTP-U) of the UE accessing the RN 2. Therefore, for uplink, when the RN 2 sends the different types of data packets to the RN 1, the data packets need to be correspondingly identified. For example, message types (for example, the data of the RN 2, the NGAP message of the UE, and a data packet of the UE in a GTP-U format) are identified by using an adaptation layer, and a UE identifier and/or an identifier of the RN 2 is added. Similarly, for downlink of the Un2 interface, when the RN 1 sends the different types of data packets to the RN 2 by using the DRB of the RN 2, the data packets also need to be correspondingly identified. For example, message types are identified by using an adaptation layer, and a UE identifier and/or an identifier of the RN 2 is added. Specifically, for the Un1 interface, a DRB of the RN 1 interface may carry the data of the RN 1, the NGAP message of the UE accessing the RN 1, user plane data of the UE accessing the RN 1, the data of the RN 2, and the NGAP message of the UE accessing the RN 2. Therefore, for uplink, when the RN 1 sends the different types of data packets to the donor eNodeB, the data packets need to be correspondingly identified. For example, message types (for example, data of an RN, an NGAP message of the UE, and a data packet of the UE in a GTP-U format) are identified by using an adaptation layer, and a UE identifier and/or an identifier of the RN (for example, the RN 1 or the RN 2) is added. Similarly, for downlink of the Un1 interface, when the donor eNodeB sends the different types of data packets to the RN 1 by using the DRB of the RN 1, the data packets also need to be correspondingly identified. For example, message types are identified by using an adaptation layer, and a UE identifier and/or an identifier of the RN is added.

The foregoing mainly describes the solutions provided in the embodiments of this application from a perspective of methods. It may be understood that to implement the foregoing functions, a network access apparatus and an access control apparatus include corresponding hardware structures and/or software modules for executing the functions. A person skilled in the art should easily be aware that in combination with the examples described in the embodiments disclosed in this specification, units and algorithms steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function modules of the network access apparatus and the access control apparatus may be divided based on the foregoing method examples. For example, each function module may be divided corresponding to each function, or two or more functions may be integrated into one processing module. The integrated module may be implemented in a form of hardware, or may be implemented in a form of a software functional module. It should be noted that in the embodiments of this application, module division is an example, and is merely logical function division. In actual implementation, another division manner may be used.

Figure 21:
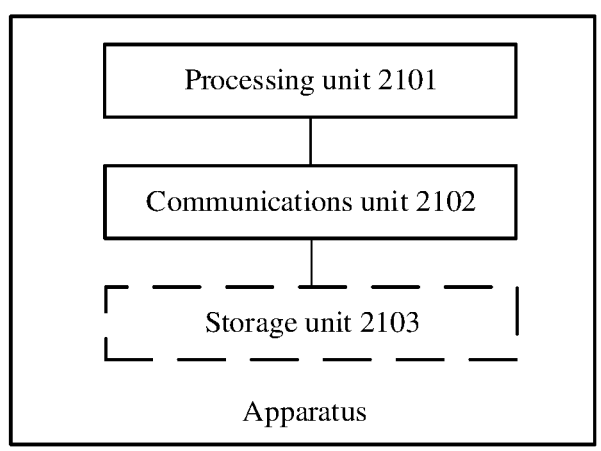
FIG. 21 is a schematic diagram of an apparatus according to an embodiment of this application.

When an integrated unit is used, FIG. 21 is a possible schematic structural diagram of an apparatus in the foregoing embodiments. The apparatus includes a processing unit 2101 and a communications unit 2102, and may further include a storage unit 2103. The schematic structural diagram shown in FIG. 21 may be used to illustrate a structure of the network access apparatus or the access control apparatus in the foregoing embodiments.

When the schematic structural diagram shown in FIG. 21 is used to illustrate the structure of the network access apparatus in the foregoing embodiments, the processing unit 2101 is configured to control and manage an action of the network access apparatus. For example, the processing unit 2101 is configured to support the network access apparatus in performing an action performed by the network access apparatus in the process in FIG. 5 and/or another process described in the embodiments of this application. The communications unit 2102 is configured to support the network access apparatus in communicating with another network entity, for example, communicating with a first communications site to obtain a site type of the first communications site. The storage unit 2103 is configured to store program code and data of the network access apparatus.

The access control apparatus may be a first RN, a first communications site (in this case, a site type of the first communications site is an RN), or a donor eNodeB (in this case, the donor eNodeB may be a first communications site or a donor eNodeB connected to a first communications site).

When the schematic structural diagram shown in FIG. 21 is used to illustrate a structure of the first RN in the foregoing embodiments, the processing unit 2101 is configured to control and manage an action of the first RN. For example, the processing unit 2101 is configured to support the first RN in performing 702, 703, 710, 711, and 714 in the process in FIG. 7, 804 in the process in FIG. 8, 1002 in the process in FIG. 10, 1101 in the process in FIGS. 11, 1211, 1212, and 1215 in the process in FIGS. 12, 1302, 1303, and 1305 in the process in FIG. 13, 1402 in the process in FIG. 14, 1502 in the process in FIG. 15, and/or an action performed by the first RN in another process described in the embodiments of this application. The communications unit 2102 is configured to support the first RN in communicating with another network entity, for example, communicating with a first communications site. The storage unit 2103 is configured to store program code and data of the first RN.

When the schematic structural diagram shown in FIG. 21 is used to illustrate a structure of the first communications site in the foregoing embodiments, the processing unit 2101 is configured to control and manage an action of the first communications site. For example, the processing unit 2101 is configured to support the first communications site in performing 701 to 704, 709, 711, 712, 714, and 715 in the process in FIGS. 7, 802 and 803 in the process in FIG. 8, 1102 in the process in FIGS. 11, 1202, 1203, 1206, 1210, 1211, 1213, 1214, 1216, and 1220 in the process in FIGS. 12, 1301, 1302, 1304, 1306, and 1311 in the process in FIG. 13, and/or an action performed by the first communications site in another process described in the embodiments of this application. The communications unit 2102 is configured to support the first communications site in communicating with another network entity, for example, communicating with a donor eNodeB. The storage unit 2103 is configured to store program code and data of the first communications site.

When the schematic structural diagram shown in FIG. 21 is used to illustrate a structure of the donor eNodeB in the foregoing embodiments, the processing unit 2101 is configured to control and manage an action of the donor eNodeB. For example, the processing unit 2101 is configured to support the donor eNodeB in performing 705, 708, 712, 713, 715, and 716 in the process in FIG. 7, 801 in the process in FIG. 8, 1001 in the process in FIGS. 10, 1201, 1202, 1204, 1205, 1207, 1209, 1217, and 1219 in the process in FIGS. 12, 1307, 1308, and 1310 in the process in FIGS. 13, 1503 and 1504 in the process in FIG. 15, and/or an action performed by the donor eNodeB in another process described in the embodiments of this application. The communications unit 2102 is configured to support the donor eNodeB in communicating with another network entity, for example, communicating with a first RN. The storage unit 2103 is configured to store program code and data of the donor eNodeB.

The processing unit 2101 may be a processor or a controller. The communications unit 2102 may be a communications interface, a transceiver, a transceiver circuit, or the like. The communications interface is a general term, and may include one or more interfaces. The storage unit 2103 may be a memory. When the processing unit 2101 is a processor, the communications unit 2102 is a communications interface, and the storage unit 2103 is a memory, for a schematic composition diagram of the network access apparatus, the first RN, or the first communications site in the embodiments of this application, refer to the relay node shown in FIG. 1.

When FIG. 1 is the schematic composition diagram of the network access apparatus, the processor 101 controls and manages an action of the network access apparatus, to perform a processing process performed by the network access apparatus in the embodiments of this application. For example, the processor 101 is configured to support the network access apparatus in performing the action performed by the network access apparatus in the process in FIG. 5 and/or the another process described in the embodiments of this application.

When FIG. 1 is the schematic composition diagram of the first RN, the processor 101 controls and manages an action of the first RN, to perform a processing process performed by the first RN in the embodiments of this application. For example, the processor 101 is configured to support the first RN in performing 702, 703, 710, 711, and 714 in the process in FIG. 7, 804 in the process in FIG. 8, 1002 in the process in FIG. 10, 1101 in the process in FIGS. 11, 1211, 1212, and 1215 in the process in FIGS. 12, 1302, 1303, and 1305 in the process in FIG. 13, 1402 in the process in FIG. 14, 1502 in the process in FIG. 15, and/or the action performed by the first RN in the another process described in the embodiments of this application.

When FIG. 1 is the schematic composition diagram of the first communications site, the processor 101 controls and manages an action of the first communications site, to perform a processing process performed by the first communications site in the embodiments of this application. For example, the processor 101 is configured to support the first communications site in performing 701 to 704, 709, 711, 712, 714, and 715 in the process in FIGS. 7, 802 and 803 in the process in FIG. 8, 1102 in the process in FIGS. 11, 1202, 1203, 1206, 1210, 1211, 1213, 1214, 1216, and 1220 in the process in FIGS. 12, 1301, 1302, 1304, 1306, and 1311 in the process in FIG. 13, and/or the action performed by the first communications site in the another process described in the embodiments of this application.

For a schematic composition diagram of the donor eNodeB, refer to the base station shown in FIG. 2. The processor 201 controls and manages an action of the donor eNodeB, to perform a processing process performed by the donor eNodeB in the embodiments of this application. For example, the processor 201 is configured to support the donor eNodeB in performing 705, 708, 712, 713, 715, and 716 in the process in FIG. 7, 801 in the process in FIG. 8, 1001 in the process in FIGS. 10, 1201, 1202, 1204, 1205, 1207, 1209, 1217, and 1219 in the process in FIGS. 12, 1307, 1308, and 1310 in the process in FIGS. 13, 1503 and 1504 in the process in FIG. 15, and/or the action performed by the donor eNodeB in the another process described in the embodiments of this application.

An embodiment of this application further provides a network access apparatus. The apparatus may exist in a product form of a chip. The apparatus includes a processor, a memory, and a transceiver component. The transceiver component includes an input/output circuit. The memory is configured to store a computer-executable instruction. The processor executes the computer-executable instruction stored in the memory, to implement any method described in the foregoing embodiments.

An embodiment of this application further provides a computer-readable storage medium, including an instruction. When run on a computer, the instruction enables the computer to perform any method described in the foregoing embodiments.

An embodiment of this application further provides a computer program product including an instruction. When run on a computer, the computer program product enables the computer to perform any method described in the foregoing embodiments.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the processes or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a good effect.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A method, comprising:
   receiving, by a first relay node (RN), first access control information sent by a second RN, wherein the second RN is connected to a donor base station, or the second RN is connected to the donor base station through at least one third RN, and wherein the first access control information comprises a first RN-specific cell bar parameter, a first hop count of an RN allowed to access the second RN, a total quantity of RNs allowed to access the second RN, a load that the second RN can bear, and a type of RN allowed to access the second RN; and
   camping on or accessing, by the first RN based on the first access control information, a cell provided by the second RN.

2. The method according to claim 1, further comprising:
   generating, by the first RN, second access control information comprising a second hop count of an RN allowed to access the first RN, wherein the second hop count is the first hop count subtracted by one.

3. The method according to claim 2, further comprising:
   in response to the first hop count of the RN allowed to access the second RN being greater than zero, determining, by the first RN, to access the second RN.

4. An apparatus applied to a first relay node (RN), comprising:
   at least one processor; and
   a non-transitory memory storing instructions executable by the at least one processor, wherein the instructions are executable by the at least one processor to cause the apparatus to perform operations comprising:
      receiving first access control information sent by a second RN, wherein the second RN is connected to a donor base station, or the second RN is connected to the donor base station through at least one third RN, and wherein the first access control information comprises a first RN-specific cell bar parameter, a first hop count of an RN allowed to access the second RN, a total quantity of RNs allowed to access the second RN, a load that the second RN can bear, and a type of RN allowed to access the second RN; and
      camping on or accessing, based on the first access control information, a cell provided by the second RN.

5. The apparatus according to claim 4, wherein the instructions are executable by the at least one processor to cause the apparatus to perform further operations comprising:
   generating second access control information comprising a second hop count of an RN allowed to access the first RN, wherein the second hop count is the first hop count subtracted by one.

6. The apparatus according to claim 4, wherein the instructions are executable by the at least one processor to cause the apparatus to perform further operations comprising:
   generating second access control information comprising a total quantity of RNs allowed to access the first RN, wherein the total quantity of RNs allowed to access the first RN is the total quantity of RNs allowed to access the second RN subtracted by one.

7. The apparatus according to claim 4, wherein the second RN receives second access control information from a donor eNodeB, and the second access control information comprises a second RN-specific cell bar parameter, a second hop count of an RN allowed to access the donor eNodeB, or a total quantity of RNs allowed to access the donor eNodeB.

8. A method, comprising:
   receiving, by a first relay node (RN), first access control information sent by a second RN, wherein the second RN is connected to a donor base station, or the second RN is connected to the donor base station through at least one third RN, and wherein the first access control information comprises a total quantity of RNs allowed to access the second RN; and
   camping on or accessing, by the first RN based on the first access control information, a cell provided by the second RN.

9. The method according to claim 8, further comprising:
generating, by the first RN, second access control information comprising a total quantity of RNs allowed to access the first RN, wherein the total quantity of RNs allowed to access the first RN is the total quantity of RNs allowed to access the second RN subtracted by one.

10. The method according to claim 9, further comprising:
in response to the total quantity of RNs allowed to access the second RN being greater than zero, determining, by the first RN, to access the second RN.

* * * * *